US010742287B2

(12) United States Patent
Ryu et al.

(10) Patent No.: US 10,742,287 B2
(45) Date of Patent: Aug. 11, 2020

(54) DYNAMIC BEAM MANAGEMENT FOR WIRELESS COMMUNICATIONS

(71) Applicant: QUALCOMM Incorporated, San Diego, CA (US)

(72) Inventors: Jung Ho Ryu, Fort Lee, NJ (US); Navid Abedini, Somerset, NJ (US); Junyi Li, Chester, NJ (US); Karl Georg Hampel, Hoboken, NJ (US); Juergen Cezanne, Ocean Township, NJ (US); Sundar Subramanian, San Diego, CA (US); Muhammad Nazmul Islam, Edison, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/189,503

(22) Filed: Nov. 13, 2018

(65) Prior Publication Data

US 2019/0158162 A1 May 23, 2019

Related U.S. Application Data

(60) Provisional application No. 62/589,356, filed on Nov. 21, 2017.

(51) Int. Cl.
*H04B 7/02* (2018.01)
*H04B 7/06* (2006.01)
(Continued)

(52) U.S. Cl.
CPC ......... *H04B 7/0617* (2013.01); *H04B 7/0639* (2013.01); *H04B 7/0682* (2013.01);
(Continued)

(58) Field of Classification Search
CPC .. H04B 7/0617; H04B 7/0639; H04B 7/0682; H04B 7/0834; H04B 7/088;
(Continued)

(56) References Cited

U.S. PATENT DOCUMENTS

| 2016/0142959 A1* | 5/2016 | Wang | H04W 36/245 |
| | | | 455/436 |
| 2019/0037424 A1 | 1/2019 | Shirasaki | |

(Continued)

OTHER PUBLICATIONS

ZTE Corporation, "Enhancements on beamformed CSI-RS," 3GPP TSG RAN WG1 Meeting #86, R1-166324; Gothenburg, Sweden Aug. 22-26, 2016: Item: 7.2.4.1.2; Document for: Discussion and Decision 3GPP TSG RAN WG1, Meeting #86 R1-166324 Gothenburg, Sweden Aug. 22-26, 2016., 4 pages.*

(Continued)

*Primary Examiner* — Tesfaldet Bocure
(74) *Attorney, Agent, or Firm* — Linda G. Gunderson; Holland & Hart LLP

(57) ABSTRACT

Methods, systems, and devices for updating beam-based communications are described. A base station may configure a user equipment (UE) with a set of beam management configurations, which may be used to modify (e.g., dynamically or periodically) beam-based communications. For example, the base station may indicate a beam configuration for utilization by the UE and the UE may switch to the indicated beam configuration or update a currently used beam configuration based on the indication. In another example, a set of beam configurations may be sequentially ordered, and the base station may indicate to the UE to use the next beam configuration in the sequence of beam configurations. The update to the beam configuration may be triggered based on a distance change (e.g., UE and base station getting closer or farther apart) or a reference signal
(Continued)

measurement between the UE and the base station, among other factors.

30 Claims, 14 Drawing Sheets

(51) Int. Cl.
*H04B 7/08* (2006.01)
*H04W 64/00* (2009.01)

(52) U.S. Cl.
CPC ........... *H04B 7/088* (2013.01); *H04B 7/0834* (2013.01); *H04W 64/003* (2013.01)

(58) Field of Classification Search
CPC ...... H04B 7/0695; H04B 7/02; H04B 7/0408; H04W 64/003; H04W 72/042; H04W 24/10; H04L 5/0048
USPC .................. 375/262, 299, 347; 455/101, 132
See application file for complete search history.

(56) References Cited

U.S. PATENT DOCUMENTS

| | | | |
|---|---|---|---|
| 2019/0037426 A1* | 1/2019 | Yu .......................... | H04L 5/0048 |
| 2019/0068263 A1* | 2/2019 | Yu ........................ | H04B 7/0617 |
| 2019/0103908 A1* | 4/2019 | Yu ........................ | H04B 7/0695 |

OTHER PUBLICATIONS

ZTE Corporation "Beam selection and CSI acquisition for NR MIMO," 3GPP TSG RAN WG1 Meeting #86, R1-166212, Gothenburg, Sweden Aug. 22-26, 2016, Agenda Item: 8.1.5 Document for: Discussion and Decision., 6 pages.*
Sharetechnote, "5G/NR—Beam Management," pp. 1-11, retrieved from http://www.sharetechnote.com/ on Dec. 13, 2019.*
Apple Inc: "Discussion on Beam Measurement and Reporting," 3GPP Draft; R1-1720117 Discussion on Beam Measurement and Reporting, 3rd Generation Partnership Project (3GPP), Mobile Competence Centre; 650, Route Des Lucioles; F-06921 Sophia-Antipolis Cedex; FR, vol. RAN WG1, No. Reno, USA; Nov. 27, 2017-Dec. 1, 2017, Nov. 18, 2017, XP051369790, 6 Pages, Retrieved from the Internet: URL: http://www.3gpp.org/ftp/tsg%5Fran/WG1%5FRL1/TSGR1%F91/Docs/ [retrieved on Nov. 18, 2017].
Catt, et al: "Further Considerations on Events C1 and C2," 3GPP Draft; R2-1712416, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017, Nov. 17, 2017, XP051371465, 4 pages, Retrieved from the Internet: URL: http://www..3gpp.org/ftp/tsg%5Fran/WG2%5FRL2/TSGR2%5F100/Docs/ [retrieved on Nov. 17, 2017].
International Search Report and Written Opinion—PCT/US2018/060940—ISA/EPO—dated Mar. 18, 2019.
ZTE Corporation, et al: "Enhancements on Beamformed CSI-RS," 3GPP Draft; R1-164310 Enhancements on Beamformed CSI-RS, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 14, 2016, XP051096493, 6 pages, Retrieved from the Internet: URL:http://www.3gpp.org/ftp/tsg_ran/WG1_RL1/TSGR1_85/Docs/ [retrieved on May 14, 2016].

* cited by examiner

DYNAMIC BEAM MANAGEMENT FOR WIRELESS COMMUNICATIONS

CROSS REFERENCES

The present Application for Patent claims the benefit of U.S. Provisional Patent Application No. 62/589,356 by RYU et al., entitled "DYNAMIC BEAM MANAGEMENT FOR WIRELESS COMMUNICATIONS," filed Nov. 21, 2017, assigned to the assignee hereof, and expressly incorporated by reference herein.

BACKGROUND

The following relates generally to wireless communications, and more specifically to dynamic beam management for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Next generation wireless communications systems may rely on millimeter wave (mmW) communication technologies that utilize beamformed transmissions/receptions to provide directional communications. Each beamformed transmission/reception may have an associated beam configuration, such as a beam width, a beam direction, a beam shape, etc. A transmit beam may refer to a digital/analog antenna configuration that provides a directional transmission towards a receiving device, such as a UE. A receive beam may refer to a digital/analog antenna configuration that provides directional reception of a beam from a transmitting device, such as a base station. For a beam pair used for wireless communications, the transmit beam may be the same as or different from the receive beam (e.g., due to beam reflection, diffraction, or the like) and the transmit or receive beams may change for each transmission.

Some systems (e.g., mmW systems) present unique challenges with respect to timing, interference management, medium access, or the like. For example, the directionality of transmissions and/or receptions prove a certain level of deafness in a mmW network, e.g., a device may be "deaf" with respect to an incoming beamformed signal if the device's receive beam configuration is directed away from the transmitting device. Different beam configurations may be appropriate for different transmission distances. A UE in a high mobility scenario may quickly change its relative distance from a serving cell and therefore, the base station may change beams as the relative location of the UE changes. Frequently exchanging beam configuration information and selecting a beam as the UE changes its relative location may take a significant amount of time and thus be too slow to be used by a UE in a high mobility scenario, which may result in the UE being deaf or the devices being delayed in selecting a strong beam.

SUMMARY

The described techniques relate to improved methods, systems, devices, or apparatuses in accordance with various aspects of the present disclosure. A base station may configure a user equipment (UE) with a set of beam management configurations. The base station, the UE, or both, may modify a beam configuration used in beam-based communications based on the set of beam management configurations. Updates to the beam configuration may be indicated dynamically by the base station or indicated periodically by the base station (e.g., in resources allocated for semi-persistent scheduling), or a combination thereof. For example, the base station may indicate a beam configuration in the set of beam configurations for utilization by the UE, and the UE may switch to the indicated beam configuration or update a currently used beam configuration based on the indication. In another example, the set of beam configurations may be sequentially ordered, and the base station may indicate to the UE to use the next beam configuration in the sequence of beam configurations. In some cases, a change in beam configuration may be triggered based on the distance between the UE and the base station changing (e.g., getting closer or farther apart) or a reference signal measurement (e.g., reference signal received power (RSRP) measurements), or both. In some examples, the UE and base station may autonomously update the beam configuration based on the distance between the UE and the base station or the reference signal measurement. For example, the UE and the base station may update the beam configuration based on a sequential beam configuration in the indicated set of beam configurations.

A method of wireless communications is described. The method may include receiving, at a UE, an indication of one or more beam management configurations from a first base station, the one or more beam management configurations being for managing a beam based communication with the first base station, identifying, at the UE, a first beam management configuration from the one or more beam management configurations, determining, by the UE, a configuration change trigger for triggering a change from the first beam management configuration to a second beam management configuration from the one or more beam management configurations, modifying a beam management configuration of the UE according to the second beam management configuration based at least in part on the configuration change trigger, and communicating with the first base station using beam-based communications in accordance with the beam management configuration.

An apparatus for wireless communications is described. The apparatus may include means for receiving, at a UE, an indication of one or more beam management configurations from a first base station, the one or more beam management configurations being for managing a beam based communication with the first base station, means for identifying, at the UE, a first beam management configuration from the one or more beam management configurations, means for determining, by the UE, a configuration change trigger for triggering a change from the first beam management configuration to a second beam management configuration from the one or more beam management configurations, means for modifying a beam management configuration of the UE according to the second beam management configuration based at least in part on the configuration change trigger, and means for communicating with the first base station using beam-based communications in accordance with the beam management configuration.

Another apparatus for wireless communications is described. The apparatus may include a processor, memory in electronic communication with the processor, and instructions stored in the memory. The instructions may be operable to cause the processor to receive, at a UE, an indication of one or more beam management configurations from a first base station, the one or more beam management configurations being for managing a beam based communication with the first base station, identify, at the UE, a first beam management configuration from the one or more beam management configurations, determine, by the UE, a configuration change trigger for triggering a change from the first beam management configuration to a second beam management configuration from the one or more beam management configurations, modify a beam management configuration of the UE according to the second beam management configuration based at least in part on the configuration change trigger, and communicate with the first base station using beam-based communications in accordance with the beam management configuration.

A non-transitory computer-readable medium for wireless communications is described. The non-transitory computer-readable medium may include instructions operable to cause a processor to receive, at a UE, an indication of one or more beam management configurations from a first base station, the one or more beam management configurations being for managing a beam based communication with the first base station, identify, at the UE, a first beam management configuration from the one or more beam management configurations, determine, by the UE, a configuration change trigger for triggering a change from the first beam management configuration to a second beam management configuration from the one or more beam management configurations, modify a beam management configuration of the UE according to the second beam management configuration based at least in part on the configuration change trigger, and communicate with the first base station using beam-based communications in accordance with the beam management configuration.

Some examples of the method, apparatus, and non-transitory computer-readable medium described herein may further include processes, features, means, or instructions for determining a location of the UE relative to the first base station or a second base station, where the configuration change trigger may be determined based on the location of the UE.

In some examples of the method, apparatus, and non-transitory computer-readable medium described herein, determining the location of the UE includes determining a linear distance or an angular distance traveled by the UE.

In some examples of the method, apparatus, and non-transitory computer-readable medium described herein, determining the location of the UE includes estimating the location of the UE based at least in part on a round trip time (RTT) of downlink or uplink received timings.

In some examples of the method, apparatus, and non-transitory computer-readable medium described herein, modifying the beam management configuration of the UE includes increasing or decreasing a beam sweep periodicity according to the second beam management configuration.

In some examples of the method, apparatus, and non-transitory computer-readable medium described herein, modifying the beam management configuration of the UE includes maintaining a beam sweep periodicity of the first beam management configuration and increasing or decreasing a beam width according to the second beam management configuration.

In some examples of the method, apparatus, and non-transitory computer-readable medium described herein, the one or more beam management configurations may be a set of beam management configurations for the UE.

In some examples of the method, apparatus, and non-transitory computer-readable medium described herein, the indication includes one or more bits, each of the one or more bits corresponding to a respective set of the set of beam management configurations.

In some examples of the method, apparatus, and non-transitory computer-readable medium described herein, the indication includes a single bit that indicates a change to a subsequent beam management configuration of the set of beam management configurations.

In some examples of the method, apparatus, and non-transitory computer-readable medium described herein, the set of beam management configurations includes a sequence of beam management configurations. In some examples of the method, apparatus, and non-transitory computer-readable medium described herein, the second beam management configuration follows the first beam management configuration in the sequence of beam management configurations.

In some examples of the method, apparatus, and non-transitory computer-readable medium described herein, the set of beam management configurations corresponds to a set of base stations.

In some examples of the method, apparatus, and non-transitory computer-readable medium described herein, determining the configuration change trigger includes receiving an indication of the second beam management configuration.

In some examples of the method, apparatus, and non-transitory computer-readable medium described herein, determining the configuration change trigger includes determining to change to the second beam management configuration based at least in part on a connection time of the UE or a duration of time allocated for the first beam management configuration.

In some examples of the method, apparatus, and non-transitory computer-readable medium described herein, the duration of time allocated may be periodic or aperiodic.

Some examples of the method, apparatus, and non-transitory computer-readable medium described herein may further include processes, features, means, or instructions for comparing a signal strength of a reference signal to a threshold, where the configuration change trigger may be determined based at least in part on the comparison.

In some examples of the method, apparatus, and non-transitory computer-readable medium described herein, the signal strength includes a RSRP of a beam pair link with the first base station or an RSRP of a signal from a second base station.

In some examples of the method, apparatus, and non-transitory computer-readable medium described herein, the beam management configuration of the UE includes a set of transmission beams to sweep, a set of reception beams to sweep, an antenna port configuration, a set of resources allocation for one or more beams, a measurement window for sweeping, a periodicity of a resource allocated for one or more beams, a reporting configuration, a beamforming configuration, or a combination thereof.

In some examples of the method, apparatus, and non-transitory computer-readable medium described herein, the UE may be associated with a high-speed train.

In some examples of the method, apparatus, and non-transitory computer-readable medium described herein, the UE may be a relay for a set of UEs.

A method of wireless communications is described. The method may include indicating, by a first base station, one or more beam management configurations to a UE, the one or more beam management configurations being for managing a beam based communication by the UE with the first base station, identifying, at the first base station, a first beam management configuration for managing a beam-based communication with the UE, determining a configuration change trigger for triggering a change from the first beam management configuration to a second beam management configuration, modifying a beam management configuration for communications with the UE according to the second beam management configuration based at least in part on the configuration change trigger, and communicating with the UE using beam-based communications in accordance with the beam management configuration at the first base station and one of the one or more beam management configurations indicated to the UE.

An apparatus for wireless communications is described. The apparatus may include means for indicating, by a first base station, one or more beam management configurations to a UE, the one or more beam management configurations being for managing a beam based communication by the UE with the first base station, means for identifying, at the first base station, a first beam management configuration for managing a beam-based communication with the UE, means for determining a configuration change trigger for triggering a change from the first beam management configuration to a second beam management configuration, means for modifying a beam management configuration for communications with the UE according to the second beam management configuration based at least in part on the configuration change trigger, and means for communicating with the UE using beam-based communications in accordance with the beam management configuration at the first base station and one of the one or more beam management configurations indicated to the UE.

Another apparatus for wireless communications is described. The apparatus may include a processor, memory in electronic communication with the processor, and instructions stored in the memory. The instructions may be operable to cause the processor to indicate, by a first base station, one or more beam management configurations to a UE, the one or more beam management configurations being for managing a beam based communication by the UE with the first base station, identify, at the first base station, a first beam management configuration for managing a beam-based communication with the UE, determine a configuration change trigger for triggering a change from the first beam management configuration to a second beam management configuration, modify a beam management configuration for communications with the UE according to the second beam management configuration based at least in part on the configuration change trigger, and communicate with the UE using beam-based communications in accordance with the beam management configuration at the first base station and one of the one or more beam management configurations indicated to the UE.

A non-transitory computer-readable medium for wireless communications is described. The non-transitory computer-readable medium may include instructions operable to cause a processor to indicate, by a first base station, one or more beam management configurations to a UE, the one or more beam management configurations being for managing a beam based communication by the UE with the first base station, identify, at the first base station, a first beam management configuration for managing a beam-based communication with the UE, determine a configuration change trigger for triggering a change from the first beam management configuration to a second beam management configuration, modify a beam management configuration for communications with the UE according to the second beam management configuration based at least in part on the configuration change trigger, and communicate with the UE using beam-based communications in accordance with the beam management configuration at the first base station and one of the one or more beam management configurations indicated to the UE.

In some examples of the method, apparatus, and non-transitory computer-readable medium described herein, modifying the beam management configuration for communications with the UE includes increasing or decreasing a beam sweep periodicity according to the second beam management configuration.

In some examples of the method, apparatus, and non-transitory computer-readable medium described herein, modifying the beam management configuration for communications with the UE includes maintaining a beam sweep periodicity of the first beam management configuration and increasing or decreasing a beam width according to the second beam management configuration.

In some examples of the method, apparatus, and non-transitory computer-readable medium described herein, indicating the one or more beam management configurations to the UE includes transmitting, to the UE, an indication of a set of beam management configurations for the UE.

In some examples of the method, apparatus, and non-transitory computer-readable medium described herein, the indication includes one or more bits, each of the one or more bits corresponding to a respective set of the set of beam management configurations.

In some examples of the method, apparatus, and non-transitory computer-readable medium described herein, the indication includes a single bit that indicates a change to a subsequent beam management configuration of the set of beam management configurations.

In some examples of the method, apparatus, and non-transitory computer-readable medium described herein, the set of beam management configurations includes a sequence of beam management configurations. In some examples of the method, apparatus, and non-transitory computer-readable medium described herein, the second beam management configuration follows the first beam management configuration in the sequence of beam management configurations.

In some examples of the method, apparatus, and non-transitory computer-readable medium described herein, the set of beam management configurations corresponds to a set of base stations including the first base station.

Some examples of the method, apparatus, and non-transitory computer-readable medium described herein may further include processes, features, means, or instructions for transmitting, to the UE, an indication of the second beam management configuration.

In some examples of the method, apparatus, and non-transitory computer-readable medium described herein, determining the configuration change trigger includes determining to change to the second beam management configuration based at least in part on a connection time of the UE or a duration of time allocated for the first beam management configuration.

In some examples of the method, apparatus, and non-transitory computer-readable medium described herein, the duration of time allocated may be periodic or aperiodic.

In some examples of the method, apparatus, and non-transitory computer-readable medium described herein, the beam management configuration for communications with the UE includes a set of transmission beams to sweep, a set of reception beams to sweep, an antenna port configuration, a set of resources allocation for one or more beams, a measurement window for sweeping, a periodicity of a resource allocated for one or more beams, a reporting configuration, a beamforming configuration, or a combination thereof.

In some examples of the method, apparatus, and non-transitory computer-readable medium described herein, the UE may be associated with a high-speed train.

In some examples of the method, apparatus, and non-transitory computer-readable medium described herein, the UE may be a relay for a set of UEs.

DETAILED DESCRIPTION

Aspects of the disclosure provide for dynamic beam management in high-mobility wireless communications systems (e.g., a millimeter wave (mmW) system). For example, through dynamic updating of a beam management configuration (e.g., based on a relative distance between a user equipment (UE) and a base station), wireless communications between a UE and a base station may be more efficient and reliable. In some cases, as a UE approaches a base station, the UE may move away from a transmission beam of the base station with relatively small movements or changes in distance. The beam configuration may change to use a wider beam or to increase a beam sweep periodicity to better track or communicate with the UE using beamforming. In another example, the UE may be distant and moving farther away from the base station, such that small movements may not greatly impact a transmission beam used for communication with the base station. The beamforming configuration may then change to use narrower beams or reduce a periodicity of a beam sweep.

The base station may configure the UE with a set of beam management configurations, and the base station, the UE, or both may adjust a beam configuration used in beam-based communications. Updates to the beam configuration may be indicated dynamically by the base station or indicated periodically by the base station (e.g., in resources allocated for semi-persistent scheduling), or a combination thereof. For example, the base station may indicate which beam configuration in the set of beam configurations for the UE to use, and the UE may switch to the indicated beam configuration. In another example, the set of beam configurations may be sequentially ordered, and the base station may indicate to the UE to use the next beam configuration in the sequence of beam configurations. In some cases, a change in beam configuration may be triggered based on the distance between the UE and the base station changing (e.g., getting closer or farther apart).

Aspects of the disclosure are initially described in the context of wireless communications systems and process flows. Aspects of the disclosure are further illustrated by and described with reference to apparatus diagrams, system diagrams, and flowcharts that relate to dynamic beam management for wireless communications.

Figure 1:
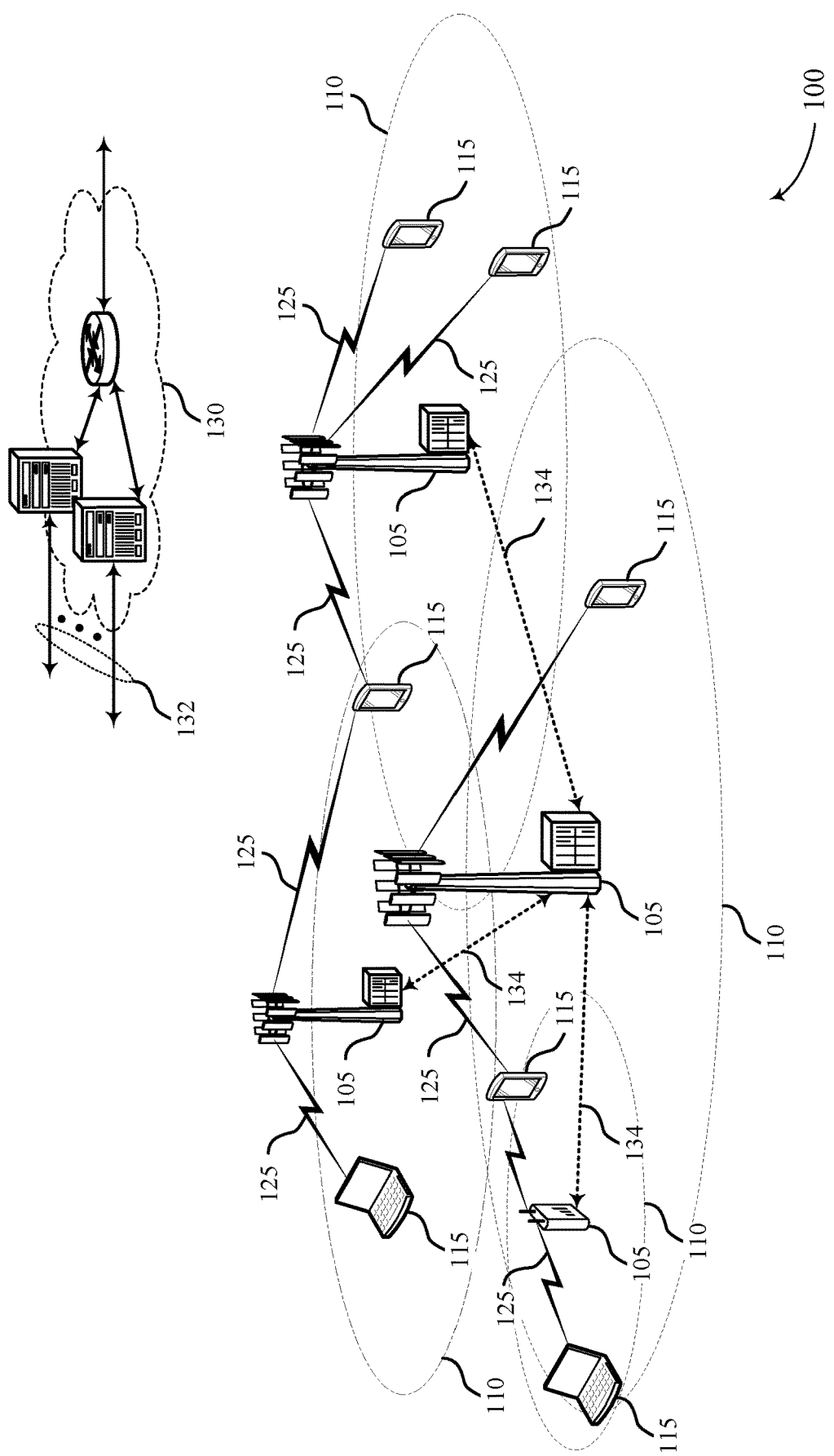
FIG. 1 illustrates an example of wireless communications system in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, a base station 105 may configure a UE 115 with a set of beam management configurations, and the base station 105, the UE 115, or both, may adjust a beam management configuration used in beam-based communications. Updates to the beam management configuration may be indicated dynamically by the base station 105 or indicated periodically by the base station 105 (e.g., in resources allocated for semi-persistent scheduling), or a combination thereof. For example, the base station 105 may indicate a beam management configuration in the set of beam management configurations for the UE 115 to use, and the UE 115 may switch to the indicated beam management configuration or update a currently used beam management configuration based on the indication. In another example, the set of beam management configurations may be sequentially ordered, and the base station 105 may indicate to the UE 115 to use the next beam management configuration in the sequence of beam configurations. In some cases, a change in beam management configuration may be triggered based on the distance between the UE 115 and the base station 105 changing (e.g., getting closer or farther apart) or a reference signal measurement (e.g., RSRP measurements), or both. In some examples, the UE 115 and base station 105 may autonomously update the beam management configuration based on the distance between the UE 115 and the base station 105 or the reference signal measurement. For example, the UE 115 and the base station 105 may update the beam management configuration based on a sequential beam management configuration in the indicated set of beam configurations.

Figure 2:
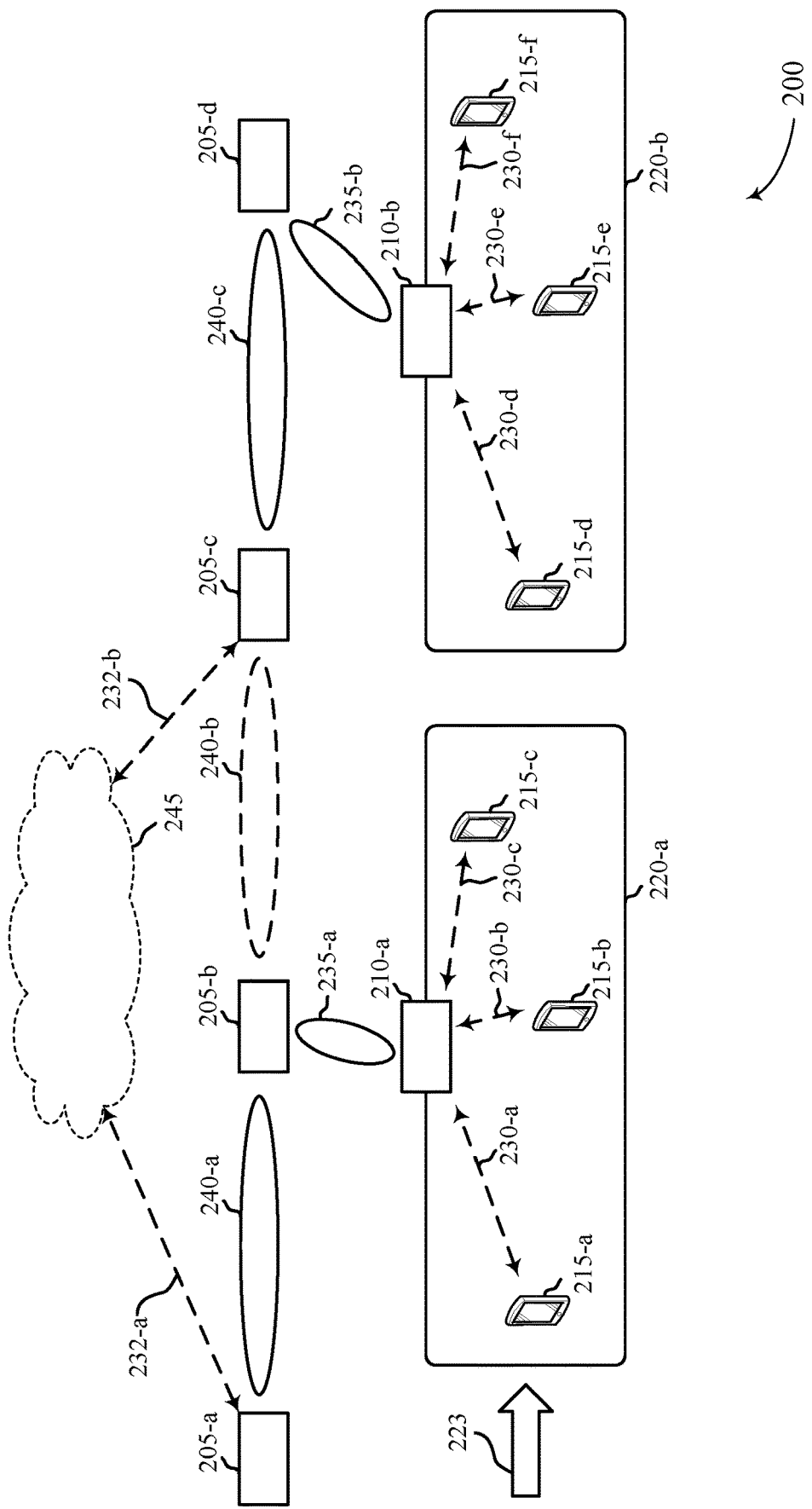
FIG. 2 illustrates an example of a wireless communications system in accordance with aspects of the present disclosure.

FIG. 2 illustrates an example of a wireless communications system 200 in accordance with various aspects of the present disclosure. In some examples, wireless communications system 200 may implement aspects of wireless communications system 100. Wireless communications system 200 may include a plurality of base stations 205, relay UEs 210, and UEs 215, which may be examples of the corresponding devices described herein.

In some aspects, the deployment scenario of wireless communications system 200 may include relay UEs 210 being mounted into vehicles 220. For example, relay UE 210-*a* may be mounted into vehicle 220-*a* and relay UE 210-*b* may be mounted into vehicle 220-*b*. Each of the vehicles 220 may include any mobile vehicle, such as an automobile, a bus, a train, a boat, a ship, a plane, and the like, that travels along a path (e.g., in direction 223). Accordingly, each base station 205 may be mounted in a fixed location and communicate with the relay UEs 210 as the corresponding vehicle 220 traverses the coverage area of the respective base station 205. In one non-limiting example, the wireless communications system 200 may support deployment of a system where the vehicles 220 (and hence the mounted relay UEs 210) are traveling at a high rate of speed, such as a high-speed rail system. Accordingly, the relay UEs 210 may be considered in a high-mobility state of operation when the vehicles 220 are in motion.

In some aspects, wireless communications system 200 illustrates one example deployment of a heterogeneous wireless communications system that utilizes more than one radio access technology (RAT). As one example, base stations 205 may be mmW gNBs that perform inter-base station communications using beamformed signals 240 and/or using wired communication links (not shown). In some aspects, some or all of the base stations 205 may be connected to a core network 245 via a backhaul link, e.g., an integrated access backhaul (IAB). In the example illustrated in FIG. 2, only base stations 205-*a* and 205-*c* have direct connections to the core network 245. In this example, base station 205-*b* may connect to the core network 245 via beamformed signal 240-*a* through base station 205-*a* and/or optionally via beamformed signal 240-*b* through base station 205-*c*. Similarly, base station 205-*d* may connect to the core network 245 via beamformed signal 240-*c* through base station 205-*c*. As can be appreciated, the number and spacing of base stations 205 and/or direct backhaul connections to the core network 245 may vary and may depend on the particular deployment scenario.

Another example of the heterogeneous deployment may include wireless links 230 between relay UEs 210 and UEs 215. In some aspects, the number and/or position of UEs 215 within a vehicle 220 may vary at any given time. For example, certain UEs 215 may depart a vehicle 220 at a first stop while other UEs 215 enter vehicle 220 at the first stop. The number and/or position of UEs 215 may change for any given stop that vehicle 220 makes. When UEs 215 enter a vehicle, the UEs 215 may establish a wireless link 230 with a relay UE 210. The wireless link 230 may be an example of any wireless RAT, such as cellular, Wi-Fi, Bluetooth, Near Field Communication (NFC), and the like. The UEs 215 may then access the core network 245 via the relay UE 210 with which they have established a wireless link 230. Each relay UE 210 may access the core network 245 using a beamformed signal 235 through an associated base station 205. For example, UE 215-*a* may communicate with relay UE 210-*a* via wireless link 230-*a*, relay UE 210-*a* may communicate with base station 205-*b* via beamformed signal 235-*a*, base station 205-*b* may communicate with base station 205-*a* via beamformed signal 240-*a*, and base station 205-*a* may provide the direct link to core network 245. As another example and for vehicle 220-*b*, UE 215-*e* may communicate with relay UE 210-*b* via wireless link 230-*e*, relay UE 210-*b* may communicate with base station 205-*d* via beamformed signal 235-*b*, base station 205-*d* may communicate with base station 205-*c* via beamformed signal 240-*c*, and base station 205-*c* may provide the direct link to core network 245. In some examples, relay UE 210 may be a mmW relay UE.

In some aspects, as vehicles 220 travel along a path, relay UEs 210 may change the base station 205 that they are associated with. For example, relay UE 210-*a* may initially be connected to base station 205-*b* and, as vehicle 220-*a* travels, relay UE 210-*a* may leave the coverage area of base station 205-*b* and enter the coverage area of base station 205-*c*. Accordingly, relay UE 210-*a* may establish a new connection to base station 205-*c*.

A beamformed signal 235 between a relay UE 210 and a base station 205 may be established as a result of a beam sweep procedure based on a beam management configuration. In some cases, a beam management configuration may include a set of beams to sweep (e.g., based on the beamforming configuration being an analog or digital configuration), a quasi co-location (QCL) configuration, an antenna port configuration, time or frequency resources for beamforming communications, a measurement window configuration, frequency of the allocated resources for the measurement windows, or a reporting configuration and requirements, or any combination thereof. Two beam management configurations may differ in any one or more of the above aspects. For example, the size of the resources, number of beams, frequency of sweeping, the allocated resources, or measurement windows, and beam width configurations may vary among beam configurations.

In some aspects, the beam management configuration for beamformed signals 235 for any given communication may vary depending upon where the relay UE 210 is located with respect to the base station 205 that it is connected to. For example, relay UE 210-*a* is located relatively closer to base station 205-*b* than relay UE 210-*b* is located with respect to base station 205-*d*. Accordingly, the beam management configuration for beamformed signal 235-*a* has a different departure angle, beam direction, beam transmit power, and the like, than beamformed signal 235-*b*. Each beam management configuration for beamformed signals 235 may have associated beam indices, e.g., an identifier that is associated with the beam configuration. The beam index being associated with a particular beam configuration may provide an indication of various parameters of the beam configuration, e.g., beam angle, beam departure angle, beam shape, beam transmit power, and the like. In some aspects, information indicative of the beam index is carried or otherwise conveyed in the associated beamformed signal 235.

As an example, beamformed signal 235-*a* may have beamforming characteristics based on the close proximity of relay UE 210-*a* to base station 205-*b*. Small changes in position may move relay UE 210-*a* out of the range of beamformed signal 235-*a*. Thus, the beam management configuration for beamformed signal 235-*a* may include using wider beams or increasing a beam sweep periodicity for tracking beam configuration changes, where the beam sweeps may be performed based on CSI-RS. In some cases, beamformed signal 235-*a* may have high signal quality (e.g., high SNR, high signal strength, etc.) due to the close proximity of the devices, so using a wide beam may not significantly reduce signal quality. Relay UE 210-*a* may stay in the coverage of a wider beam despite small changes in position. Increasing the beam sweep periodicity may increase the rate at which base station 205-*a* selects a beam index for beamformed signal 235-*a*. Thus, if relay UE 210-*a* moves out of coverage of a first beam, base station 205-*b* may quickly select another beam for beamformed signal 235-*a*.

In another example, beamformed signal 235-*b* may have a different set of beamforming characteristics based on the longer distance between relay UE 210-*b* and base station 205-*d*. Based on the angle of the beam used for beamformed signal 235-*b*, relay UE 210-*b* may stay in the beam coverage with small movements. In some cases, the beam management configuration for beamformed signal 235-*b* may include using narrower beams. Using narrow beams for beamformed signal 235-*b* may improve the SNR, which may be relatively low based on the longer distance between relay UE 210-*b* and base station 205-*d*. Additionally, or alternatively, the beam management configuration may include decreasing the beam sweep periodicity.

A base station 205 may schedule different beam management configurations for a beamformed signal 235. In some cases, the base station 205 may dynamically schedule a beam management configuration of the beamformed signal 235 as the relative location of the relay UE 210 changes. In some examples, the relay UE 210 may use the beam management configuration indicated by the base station 205, or the relay UE 210 may update a currently used beam management configuration based on the indicated beam configuration. For example, as the relay UE 210 approaches the base station 205, the beam management configuration may be triggered to change and use wider beams or a faster beam sweep periodicity. In some cases, there may be a mapping from the location of the relay UE 210 to different configurations. The mapping may be based on a relative location of the relay UE 210, a linear distance between the two devices, or an angular direction from the base station 205 to the relay UE 210, among others.

A Satellite Positioning System (SPS) may be used to determine positioning coordinates (e.g., for base stations 205, relay UEs 210, UEs 215, or other devices of wireless communications system 200), referred to herein as SPS coordinates. The SPS may use signals from regional and/or global satellite systems. Global systems include the Global Positioning System (GPS), Galileo, Global Navigation Satellite System (GLONASS), or the like. Regional satellite navigation systems include, for example, Quasi-Zenith Satellite System (QZSS) over Japan, Indian Regional Navigational Satellite System (IRNSS) over India, Beidou/Compass over China, etc., and/or various augmentation systems (e.g., a Satellite Based Augmentation System (SBAS)) that may be associated with or otherwise enabled for use with one or more global and/or regional navigation satellite systems. It should be noted that subject matter described herein is not limited to the use of space vehicles such as those space vehicles of the aforementioned global or regional satellite navigation systems.

In some examples, the base station 205 and the relay UE 210 may at least partially utilize a SPS or other positioning techniques (e.g., provided by LTE or NR communications) to determine the relative location of the relay UE 210 or the distance between the relay UE 210 and the base station 205. In some cases, the relay UE 210 or base station 205 may determine a traveled distance of the relay UE 210 based on a travelling speed and time of travel of the vehicle 220. Additionally, or alternatively, the relay UE 210 or the base station 205 may estimate the distance to the other device based on a round trip time (RTT) of communications. For example, the RTT may be based on a change in the downlink and uplink received time.

In some other examples, the base station 205 may dynamically (e.g., aperiodically) schedule a beam management configuration for the beamformed signal 235. For example, changing the beam management configuration may be triggered based on a reference signal received power (RSRP) of the beamformed signal 235. If the RSRP of the beamformed signal 235 measures below a threshold, the base station 205 may use a different beam management configuration to find an alternate beam configuration that improves signal quality or signal strength. The base station 205 may indicate the new beam management configuration to the relay UE 210 by the beamformed signal 235. The indication may trigger the relay UE 210 to modify a beam management. In some examples, the threshold may be specific to a beam management configuration or a set of beam management configurations, or the threshold may be applicable for any beam management configuration. In some cases, the RSRP measurement may be made based on the current beam pair link or a different reference signal, such as when the next best beam pair link is strong, or based on a reference signal coming from anther node (e.g., when another cell can be detected with a sufficiently strong RSRP).

In some other examples, the base station 205 may indicate a beam management configuration to the relay UE 210 based on semi-persistent scheduling. The base station 205 may schedule a sequence of beam management configurations (e.g., non-uniform configurations) for the beamformed signal 235. In some examples, the beam management configurations in the sequence may be based on an estimated relative location of the relay UE 210, which may be determined based on the path of the vehicle 220 and the relative speed (e.g., a typical relative speed) of the vehicle 220. In some examples, the beam management configurations may correspond to the estimated location of the relay UE 210 at the scheduled times. In some cases, the base station 205 may determine the beam management configurations in the sequence based on a currently used beam management configuration (e.g., a configuration used for initial communication). For example, the base station 205 may determine a set of beam management configurations for a time $T_0$, a time T, and a time $T_1$. The base station 205 may transmit the beam management configurations for $T_0$, T, and $T_1$ at times corresponding to resources allocated by the semi-persistent scheduling. The relay UE 210 may operate according to the received beam management configuration at those times. In some cases (e.g., in case of an anomaly), a base station 205 may dynamically change or override a beam management configuration indicated by semi-persistent scheduling.

In some examples, the base station 205 may employ hybrid scheduling techniques for the beam management configurations. For example, the base station 205 (e.g., a current gNB, a serving gNB for a neighboring gNB, or a gNB for a set of gNBs) may determine a superset of beam management configurations (e.g., non-uniform configurations) and indicate the set to the relay UE 210. The base station 205 may indicate the set of beam management configurations to the relay UE 210, or the relay UE 210 may be preconfigured with the set of beam management configurations. The base station 205 and the relay UE 210 may dynamically determine which beam management configuration of the set to use. In some examples, the base station 205 may transmit updated sets of beam management configurations, which may include different beam management configurations. For example, the base station 205 may transmit an updated set of beam management configurations based on changing channel conditions or a change in relative location of the relay UE 210. In some examples, hybrid scheduling or dynamic scheduling may be used to train a new beam and ready a device change beams instead of waiting for a currently used beam to sufficiently degrade. Changing the beam management configuration based on RSRP or relative location may allow the beamformed signal 235 to be trained before the beamformed signal 235 of the previous beam management configuration degrades.

As an example, the base station 205 may determine a set of M beam management configurations. In some cases, the base station 205 may transmit an n-bit indicator to the relay UE 210 (e.g., where $M \leq 2^n$) to specify a beam management configuration for the beamformed signal 235 from the set of beam management configurations. In some implementations, the M beam management configurations may be organized in a sequence of beam management configurations. For instance, the sequence may be organized based on relative distances between the base station 205 and the relay UE 210. For example, a first beam management configuration in the sequence may correspond to a first distance between the devices, and a second beam management configuration in the sequence may correspond to a slight change in the distance between the devices (e.g., using a different beam index or beam width based on whether the relay UE 210 has moved closer to the base station 205 or farther away). In some cases, the base station 205 may transmit a 1-bit indicator to trigger changing from the current beam management configuration to the next beam management configuration in the sequence (e.g., from Set(K) to Set(K+1)).

In some cases, the base station 205 and the relay UE 210 may implicitly or autonomously trigger using the next beam management configuration in the sequence. For example, changing the beam management configuration may be linked to reporting parameters such as RSRP. If a reported RSRP is below a threshold, this may trigger a beam management configuration change. The threshold may be configuration-specific (e.g., different for each beam management configuration) or universal. For example, the relay UE 210 and base station 205 may use the next beam management configuration in the sequence. In some other examples, a beam management configuration may be triggered to change based on a relative distance of the relay UE 210 and base station 205. For example, as the vehicle 220 moves closer to or farther from a base station 205, the relay UE 210 and base station 205 may change beam configurations for the beamformed signal 235. The relative distance may be determined based on time elapsed, a change in RTT, SPS, or any other techniques described herein.

In general, increasing the beam sweep periodicity or using a wider beam when a relay UE 210 is approaching a base station 205 may allow base station 205 to more easily track and communicate with the relay UE 210 (e.g., transmissions sent by base station 205 may be more likely to reach the relay UE 210 and vice-versa). Decreasing beam sweep periodicity and/or using a narrower beam with the same periodicity as the relay UE 210 moves away from base station 205 may also increase the ease with which base station 205 may communicate with the relay UE 210. For instance, as the relay UE 210 moves away from the base station 205, its change in angle with distance relative to base station 205 may decrease, meaning that a narrower beam or a lower beam sweep periodicity may account for the relay UE 210. Utilizing a narrower beam or a lower beam sweep periodicity may lower power requirements or allow for greater precision (e.g., there may be a lower chance that transmissions from the base station 205 could interfere with other transmissions).

Figure 3A:
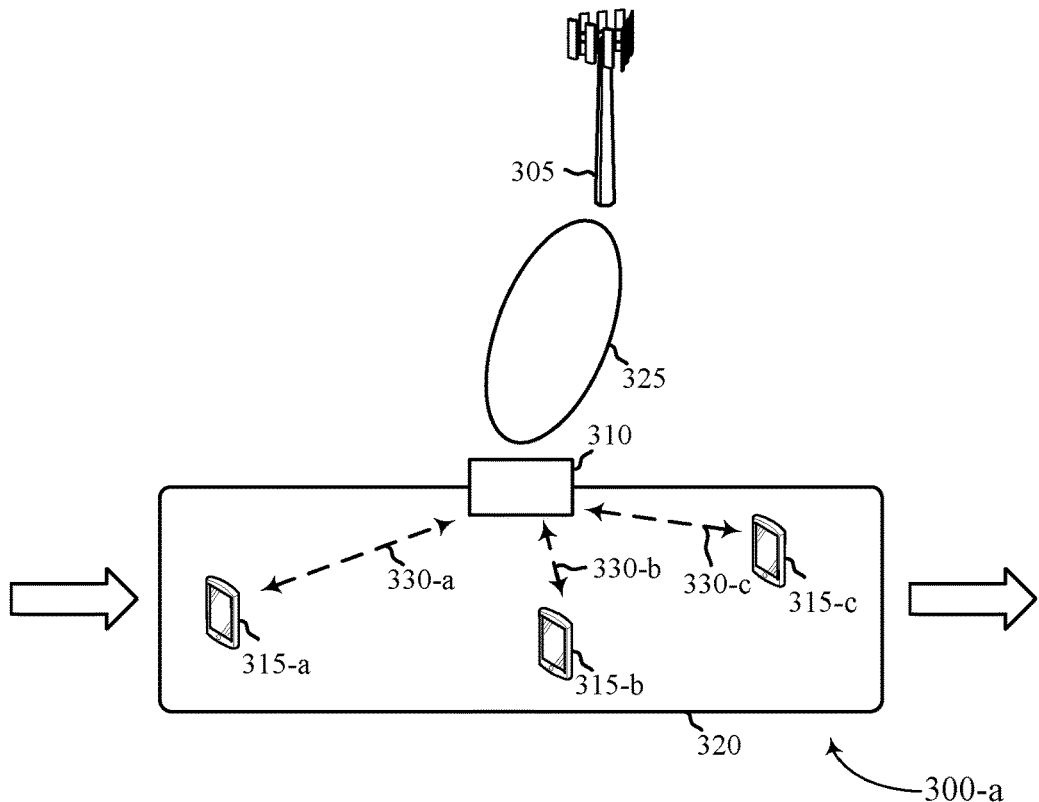
FIGS. 3A and 3B illustrate examples of a wireless communications systems in accordance with aspects of the present disclosure.
Figure 3B:
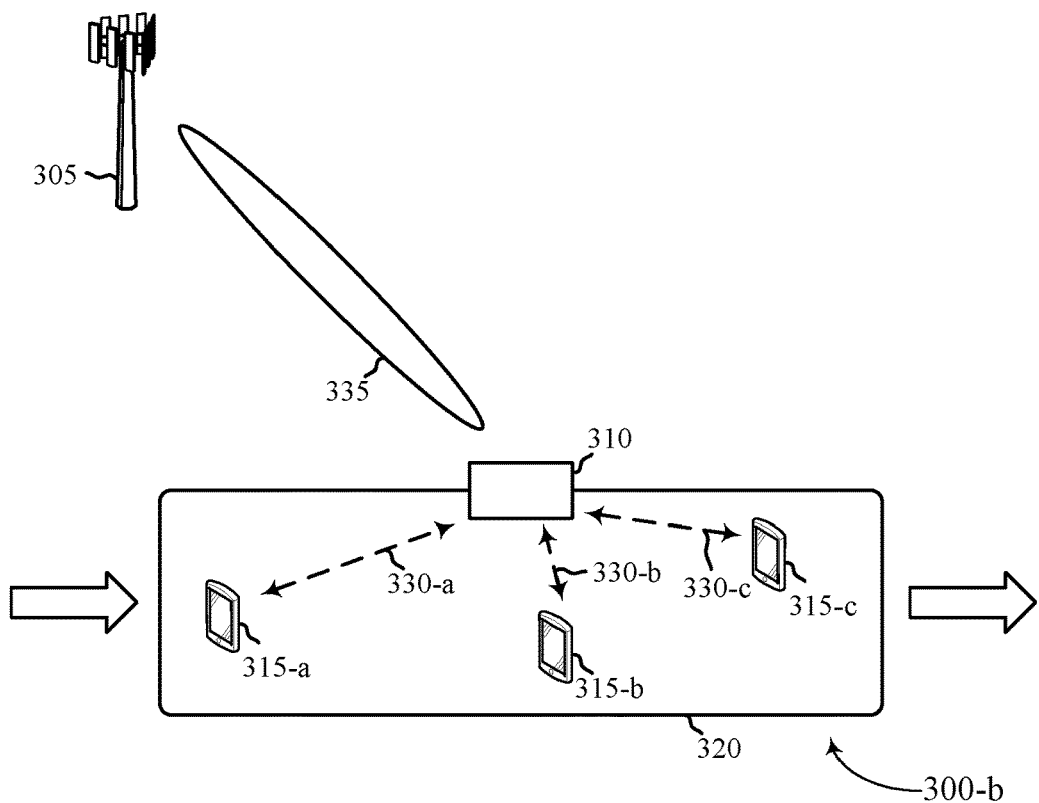

FIGS. 3A and 3B illustrate examples of a wireless communications system 300 in accordance with various aspects of the present disclosure. In some examples, wireless communications system 300 may implement aspects of wireless communications systems 100 or 200 as described with reference to FIG. 1 or 2. Wireless communications system 300 may include a base station 305, a relay UE 310, and UEs 315, which may be examples of the corresponding devices described herein. Generally, wireless communications system 300-a illustrates an example where relay UE 310 is close to base station 305 and wireless communications system 300-b illustrates an example where relay UE 310 is located farther from base station 305. Wireless communications system 300-a illustrates relay UE 310 approaching the base station 305, while wireless communications system 300-b illustrates relay UE 310 moving farther away from the base station 305.

Generally, base station 305 and relay UE 310 may communicate using beamformed signal 325 (as illustrated in FIG. 3A) and using beamformed signal 335 (as illustrated in FIG. 3B). As discussed with respect to wireless communications system 200, relay UE 310 may be mounted in vehicle 320, which may be an example of an automobile, a train, a bus, a plane, a ship, etc. UEs 315 may be positioned within vehicle 320 and relay UE 310 may provide a link between UEs 315 and base station 305. UEs 315 may communicate with relay UE 310 using wireless links 330, e.g., cellular wireless links, Wi-Fi wireless links, Bluetooth wireless links, and the like. Base station 305 may be connected to a core network directly and/or via a wireless link to another base station, such as shown in FIG. 2.

In some aspects, vehicle 320 may be mobile and move along the indicated direction. Accordingly, the position of relay UE 310 with respect to base station 305 may change over time. As the position and/or orientation of vehicle 320 (and relay UE 310 by extension) changes, the beam management configuration used for tracking and training beams between base station 305 and relay UE 310 may also change.

The beam management configuration may be scheduled according to techniques described with reference to FIG. 2. For example, the beam management configuration may be scheduled by dynamic scheduling, with beam management configurations indicated dynamically by the base station 305. The dynamic scheduling may be based on signal strength measurements (e.g., RSRP) or a location of the relay UE 310 relative to the base station 305. In another example, the base station 305 may transmit beam management configurations in resources allocated by semi-persistent scheduling. In some cases, the base station may transmit sets or sequences of beam management configurations by semi-persistent scheduling.

In some other examples, the base station 305 may employ hybrid scheduling techniques as described herein. For example, the base station 305 may configure, or pre-configure, the relay UE 310 with a set or sequence of beam management configurations. In some cases, the base station 305 may then dynamically indicate a beam management configuration for the communications. For example, the base station 305 may transmit an n-bit indicator to identify a beam management configuration and trigger a change to the identified beam management configuration, or the base station 305 may transmit a 1-bit indicator to trigger the relay UE 310 to use the next beam management configuration in the sequence. In other examples, the base station 305 and relay UE 310 may autonomously or implicitly determine a beam management configuration. For example, the base station 305 and relay UE 310 may determine to switch beam management configurations based on signal strength measurements or a location of the relay UE 310 relative to the base station 305.

For example and as is show in FIG. 3A, the beam management configuration of beamformed signal 325 may have a relatively short propagation RTT, may have a relatively direct departure angle, may have a lower beam transmit power, and the like. When the relay UE 310 and the base station 305 are close, the relay UE 310 may quickly go out of the beam width with small movements. Thus, as vehicle 320 moves closer to base station 305, the beam management configuration for the beamformed signal 325 may change to using a wider beams, or the beam management configuration may use the same sized beam with an increased beam sweep (e.g., CSI-RS) periodicity.

Conversely, and as is shown in FIG. 3B, the beam management configuration of beamformed signal 335 may have a relatively longer propagation RTT, may have a higher angle of departure, may have a higher beam transmit power, and the like. When the relay UE 310 and the base station 305 are far apart, the relay UE 310 may stay within the beam width with small movements. In some examples, as relay UE 310 moves away from the base station 305, the beam management configuration may change to use narrower beams. In some other examples, beam width may stay the same, but beam sweep periodicity may decrease.

Figure 4:
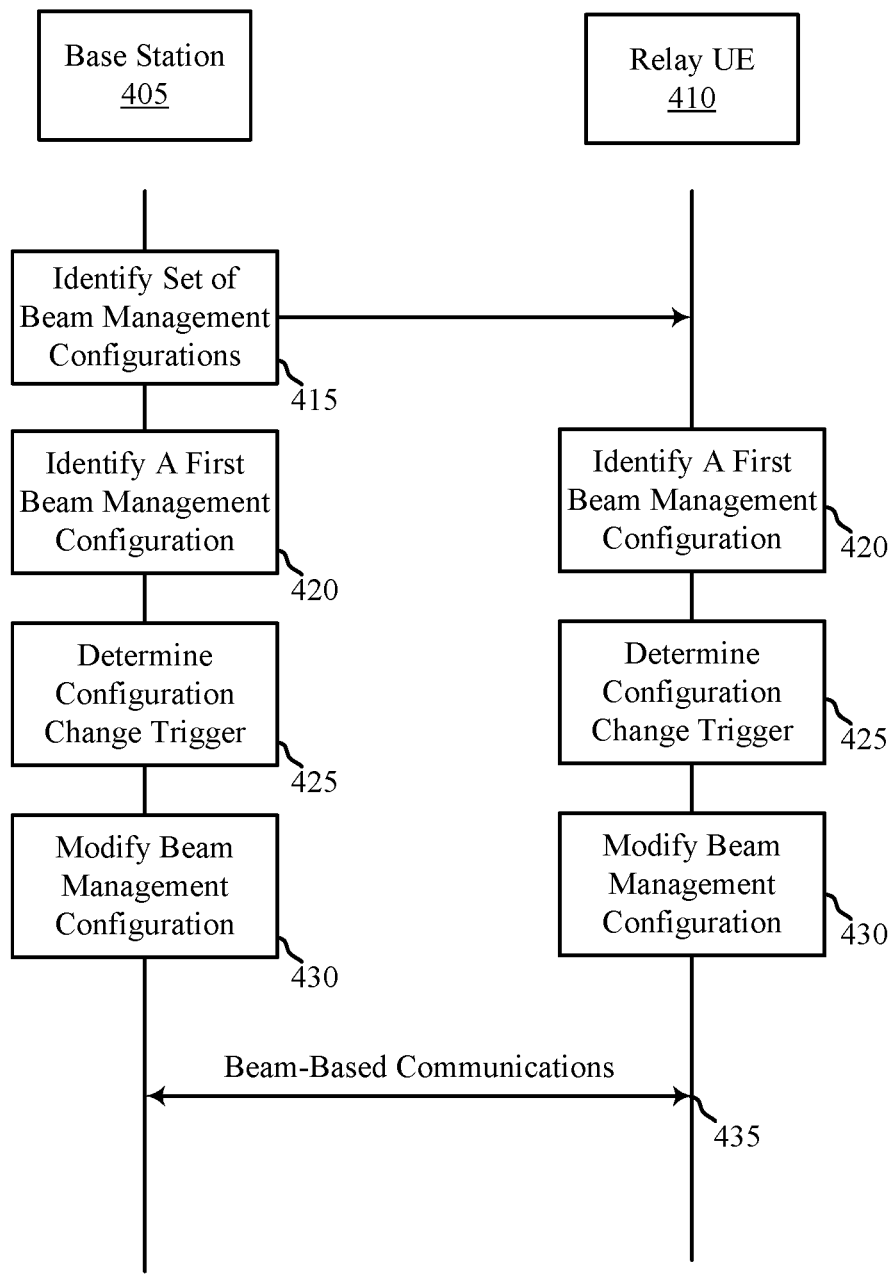
FIG. 4 illustrates an example of a process flow in accordance with aspects of the present disclosure.

FIG. 4 illustrates an example of a process flow 400 in accordance with various aspects of the present disclosure. In some examples, process flow 400 may implement aspects of wireless communications systems 100 or 200 as described with reference to FIG. 1 or 2.

Process flow 400 includes relay UE 410 and base station 405, which may be respective examples of a relay UE 210 and a base station 205 as described with reference to FIG. 2.

At 415, base station 405 may indicate one or more beam management configurations to relay UE 410. In some examples, the one or more beam management configurations may be for managing a beam-based communication by the relay UE 410 with the base station 405. In some examples, the one or more beam management configurations may be a set of beam management configurations for the relay UE 410. In some examples, the indication includes one or more bits corresponding to a respective set of the set of beam management configurations. In some other examples, the indication may include a single bit that indicates a change to a subsequent beam management configuration of the set of beam management configurations. In some cases, the set of beam management configurations may correspond to a set of base stations 405.

At 420, base station 405 or relay UE 410, or both, may identify a first beam management configuration from the one or more beam management configurations. At 425, base station 405 or relay UE 410, or both, may determine a configuration change trigger for triggering a change from the first beam management configuration to a second beam management configuration from the one or more beam management configurations. In some cases, determining the configuration change trigger may include receiving an indication of the second beam management configuration. Additionally, or alternatively, determining the configuration change trigger may include determining to change to the second beam management configuration based on a connection time of the UE or a duration of time allocated for the first beam management configuration. In some cases, the duration of time allocated may be periodic or aperiodic.

At 430, base station 405 or relay UE 410, or both, may modify a beam management configuration associated with beam-based communications between the base station 405 and the relay UE 410. In some cases, modifying the beam management configuration may include increasing or decreasing a beam sweep periodicity according to the second beam management configuration. In some other examples, modifying the configuration of the UE may include maintaining a beam sweep periodicity of the first beam management configuration and increasing or decreasing a beam width according to the second beam management configuration.

In some cases, the beam management configuration of the UE may include a set of transmission beams to sweep, a set of reception beams to sweep, an antenna port configuration, a set of resources allocated for one or more beams, a measurement window for sweeping, a periodicity of a resources allocated for one or more beams, a reporting configuration, a beamforming configuration, or any combination thereof.

Figure 5:
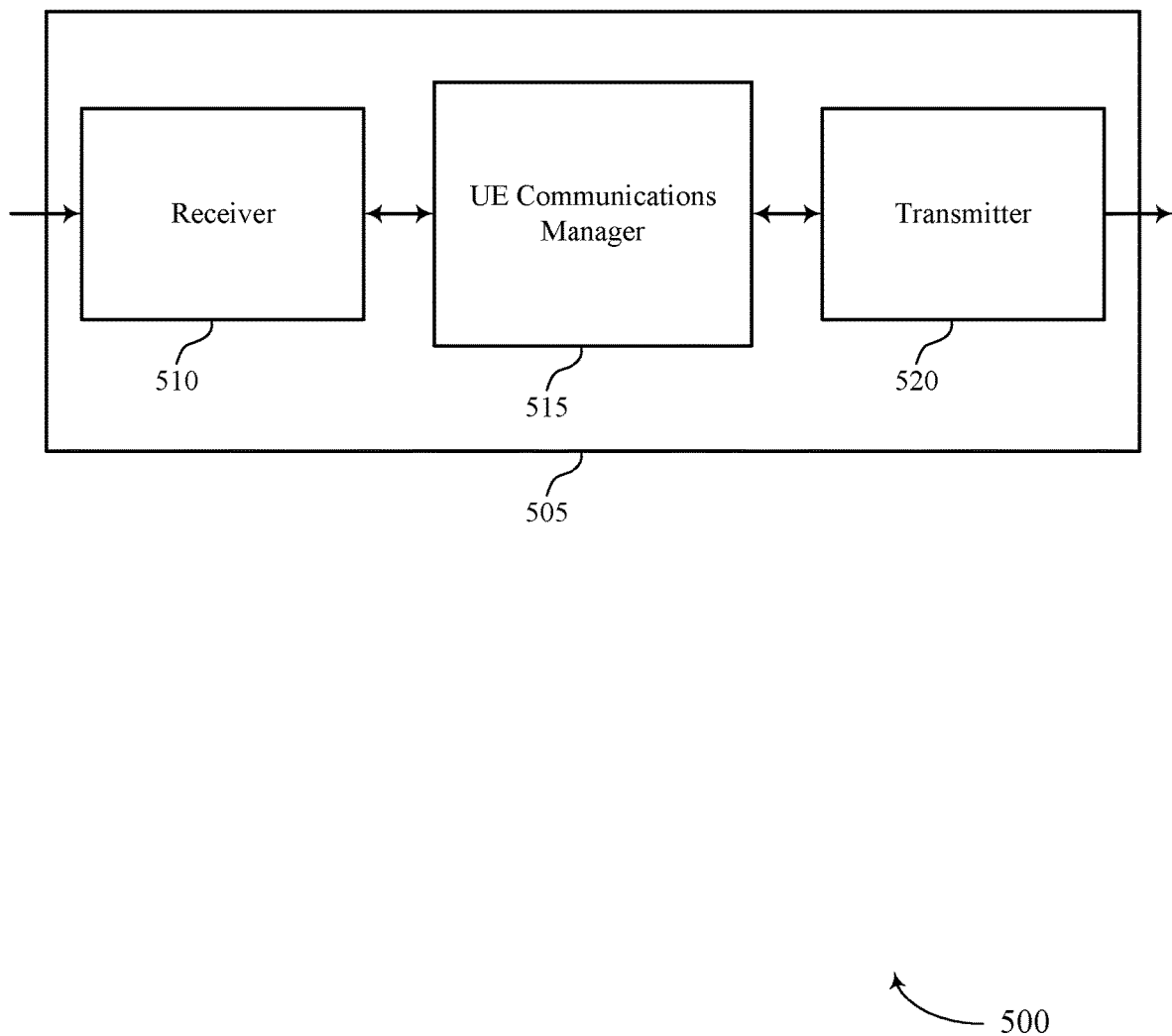
FIGS. 5 through 7 show block diagrams of a device in accordance with aspects of the present disclosure.

FIG. 5 shows a block diagram 500 of a wireless device 505 in accordance with aspects of the present disclosure. Wireless device 505 may be an example of aspects of a UE 115, a relay UE 210, a UE 215, a relay UE 310, a UE 315, and/or a relay UE 410 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to dynamic beam management for wireless communications, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive, at a UE (e.g., a UE 115, a relay UE 210, a UE 215, a relay UE 310, a UE 315, or a relay UE 410), an indication of one or more beam management configurations from a first base station (e.g., a base station 105, a base station 205, a base station 305, a base station 405), the one or more beam management configurations being for managing a beam-based communication with the first base station. UE communications manager 515 may identify, at the UE, a first beam management configuration from the one or more beam management configurations. UE communications manager 515 may determine, by the UE, a configuration change trigger for triggering a change from the first beam management configuration to a second beam management configuration from the one or more beam management configurations. UE communications manager 515 may modify a beam management configuration of the UE according to the second beam management configuration based on the configuration change trigger. UE communications manager 515 may communicate with the first base station using beam-based communications in accordance with the beam management configuration.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
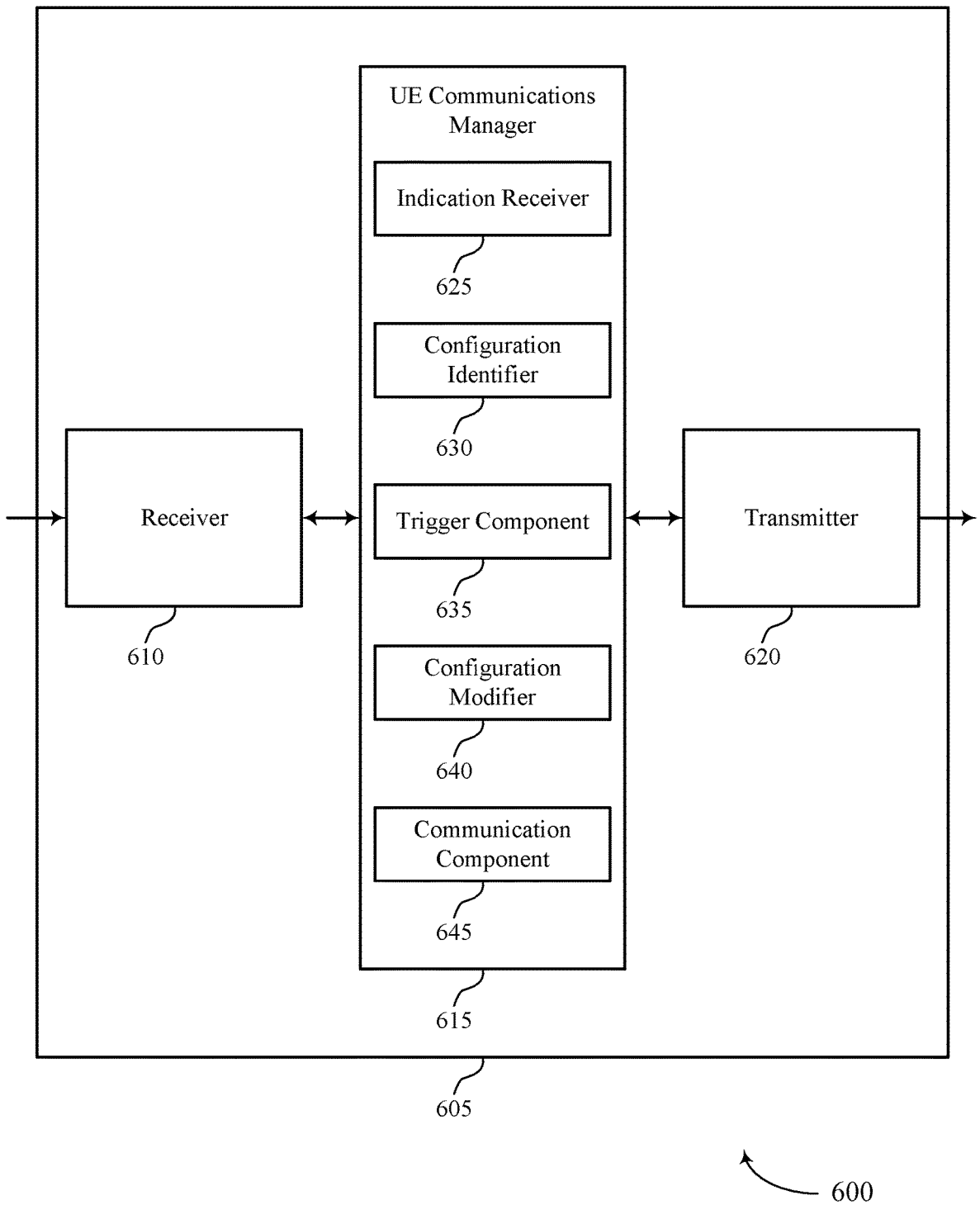

FIG. 6 shows a block diagram 600 of a wireless device 605 in accordance with aspects of the present disclosure. Wireless device 605 may be an example of aspects of a wireless device 505, a UE 115, a relay UE 210, a UE 215, a relay UE 310, a UE 315, and/or a relay UE 410 as described with reference to FIGS. 1-5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to dynamic beam management for wireless communications, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include indication receiver 625, configuration identifier 630, trigger component 635, configuration modifier 640, and communication component 645.

Indication receiver 625 may receive, at a UE (a UE 115, a relay UE 210, a UE 215, a relay UE 310, a UE 315, or a relay UE 410), an indication of one or more beam management configurations from a first base station (e.g., a base station 105, a base station 205, a base station 305, a base station 405), the one or more beam management configurations being for managing a beam-based communication with the first base station. In some cases, the one or more beam management configurations is a set of beam management configurations for the UE. In some aspects, the indication includes one or more bits, each of the one or more bits corresponding to a respective set of the set of beam management configurations. In some instances, the indication includes a single bit that indicates a change to a subsequent beam management configuration of the set of beam management configurations. In some examples, the set of beam management configurations includes a sequence of beam management configurations. In some cases, the second beam management configuration follows the first beam management configuration in the sequence of beam management configurations. In some aspects, the set of beam management configurations corresponds to a set of base stations.

Configuration identifier 630 may identify, at the UE, a first beam management configuration from the one or more beam management configurations. In some cases, the UE is associated with a high-speed train. In some examples, the UE is a relay for a set of UEs.

Trigger component 635 may determine, by the UE, a configuration change trigger for triggering a change from the first beam management configuration to a second beam management configuration from the one or more beam management configurations. In some cases, determining the configuration change trigger includes receiving an indication of the second beam management configuration. In some aspects, determining the configuration change trigger includes determining to change to the second beam management configuration based on a connection time of the UE or a duration of time allocated for the first beam management configuration. In some examples, the duration of time allocated is periodic or aperiodic.

Configuration modifier 640 may modify a beam management configuration of the UE according to the second beam management configuration based on the configuration change trigger. In some cases, modifying the beam management configuration of the UE includes increasing or decreasing a beam sweep periodicity according to the second beam management configuration. In some instances, modifying the beam management configuration of the UE includes maintaining a beam sweep periodicity of the first beam management configuration and increasing or decreasing a beam width according to the second beam management configuration. In some examples, the beam management configuration of the UE includes a set of transmission beams to sweep, a set of reception beams to sweep, an antenna port configuration, a set of resources allocation for one or more beams, a measurement window for sweeping, a periodicity of a resource allocated for one or more beams, a reporting configuration, a beamforming configuration, or a combination thereof.

Communication component 645 may communicate with the first base station using beam-based communications in accordance with the beam management configuration.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
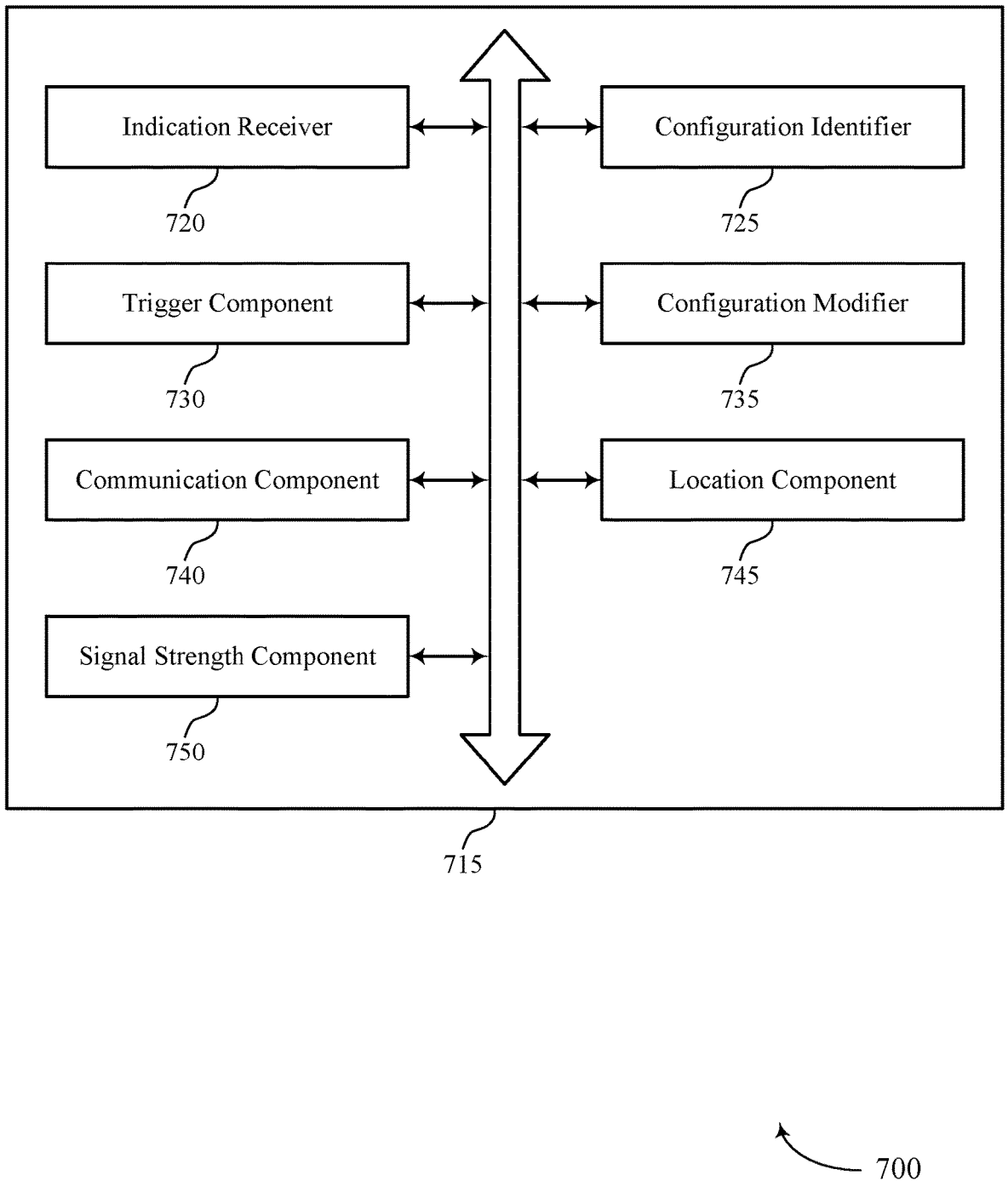

FIG. 7 shows a block diagram 700 of a UE communications manager 715 in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include indication receiver 720, configuration identifier 725, trigger component 730, configuration modifier 735, communication component 740, location component 745, and signal strength component 750. Each of these modules may communicate, directly or indirectly, with one another (e.g., via one or more buses).

Indication receiver 720 may receive, at a UE (e.g., a UE 115, a relay UE 210, a UE 215, a relay UE 310, a UE 315, or a relay UE 410), an indication of one or more beam management configurations from a first base station (e.g., a base station 105, a base station 205, a base station 305, a base station 405), the one or more beam management configurations being for managing a beam based communication with the first base station. In some cases, the one or more beam management configurations is a set of beam management configurations for the UE. In some examples, the indication includes one or more bits, each of the one or more bits corresponding to a respective set of the set of beam management configurations. In some instances, the indication includes a single bit that indicates a change to a subsequent beam management configuration of the set of beam management configurations. In some aspects, the set of beam management configurations includes a sequence of beam management configurations. In some cases, the second beam management configuration follows the first beam management configuration in the sequence of beam management configurations. In some examples, the set of beam management configurations corresponds to a set of base stations.

Configuration identifier 725 may identify, at the UE, a first beam management configuration from the one or more beam management configurations. In some cases, the UE is associated with a high speed train. In some examples, the UE is a relay for a set of UEs.

Trigger component 730 may determine, by the UE, a configuration change trigger for triggering a change from the first beam management configuration to a second beam management configuration from the one or more beam management configurations. In some cases, determining the configuration change trigger includes receiving an indication of the second beam management configuration. In some examples, determining the configuration change trigger includes determining to change to the second beam management configuration based on a connection time of the UE or a duration of time allocated for the first beam management configuration. In some instances, the duration of time allocated is periodic or aperiodic.

Configuration modifier 735 may modify a beam management configuration of the UE according to the second beam management configuration based on the configuration change trigger. In some cases, modifying the beam management configuration of the UE includes increasing or decreasing a beam sweep periodicity according to the second beam management configuration. In some examples, modifying the beam management configuration of the UE includes maintaining a beam sweep periodicity of the first beam management configuration and increasing or decreasing a beam width according to the second beam management configuration. In some aspects, the beam management configuration of the UE includes a set of transmission beams to sweep, a set of reception beams to sweep, an antenna port configuration, a set of resources allocation for one or more beams, a measurement window for sweeping, a periodicity of a resource allocated for one or more beams, a reporting configuration, a beamforming configuration, or a combination thereof.

Communication component 740 may communicate with the first base station using beam-based communications in accordance with the beam management configuration.

Location component 745 may determine a location of the UE relative to the first base station or a second base station, where the configuration change trigger is determined based on the location of the UE. In some cases, determining the location of the UE includes determining a linear distance or an angular distance traveled by the UE. In some examples, determining the location of the UE includes estimating the location of the UE based on an RTT of downlink or uplink received timings.

Signal strength component 750 may compare a signal strength of a reference signal to a threshold, where the configuration change trigger is determined based on the comparison. In some cases, the signal strength includes an RSRP of a beam pair link with the first base station or an RSRP of a signal from a second base station.

Figure 8:
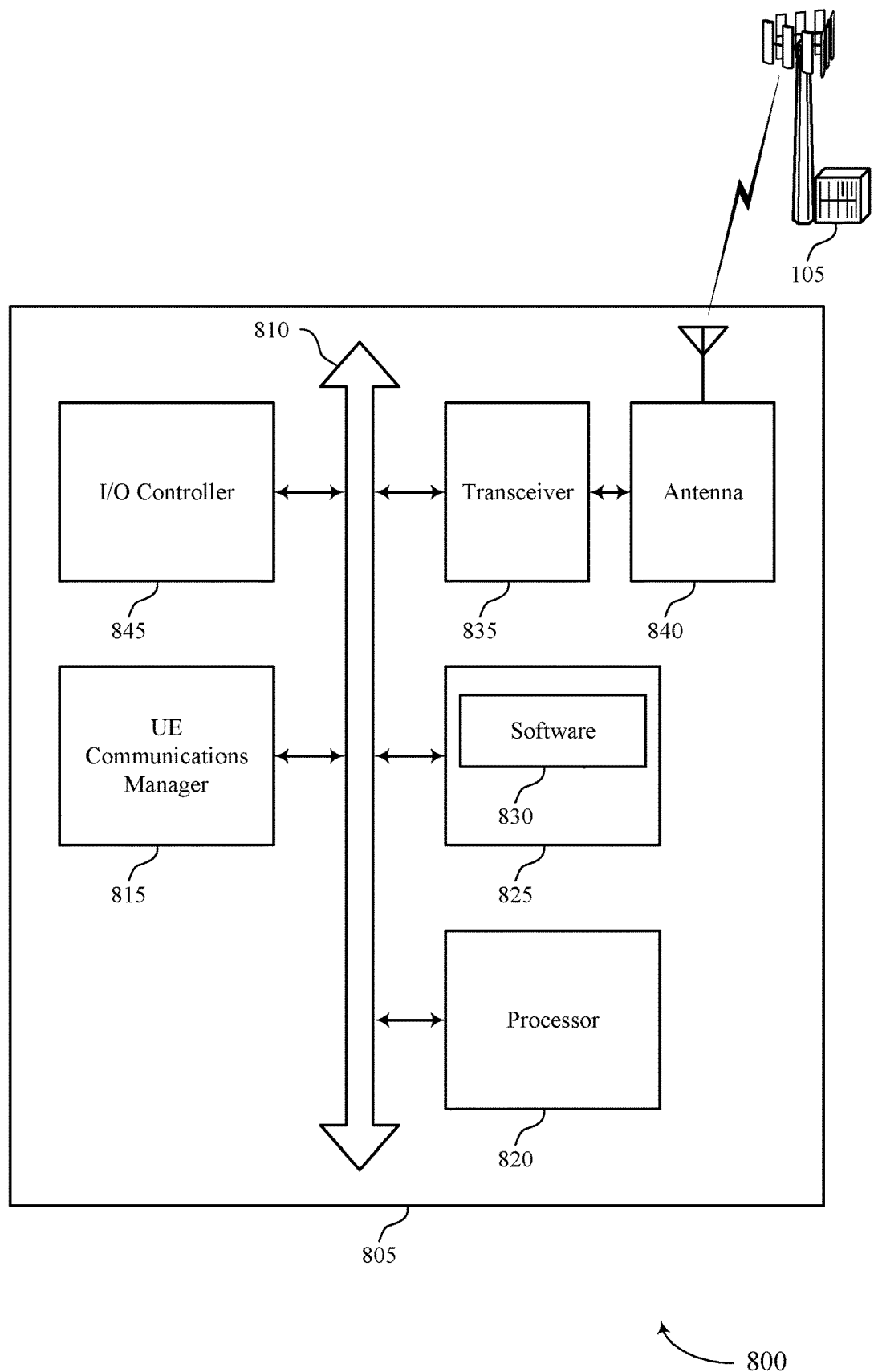
FIG. 8 illustrates a block diagram of a system including a user equipment (UE) in accordance with aspects of the present disclosure.

FIG. 8 shows a diagram of a system 800 including a device 805 in accordance with aspects of the present disclosure. Device 805 may be an example of or include the components of wireless device 505, wireless device 605, a UE 115, a relay UE 210, a UE 215, a relay UE 310, a UE 315, or a relay UE 410 as described herein, e.g., with reference to FIGS. 1-6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting dynamic beam management for wireless communications).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support dynamic beam management for wireless communications. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described herein. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
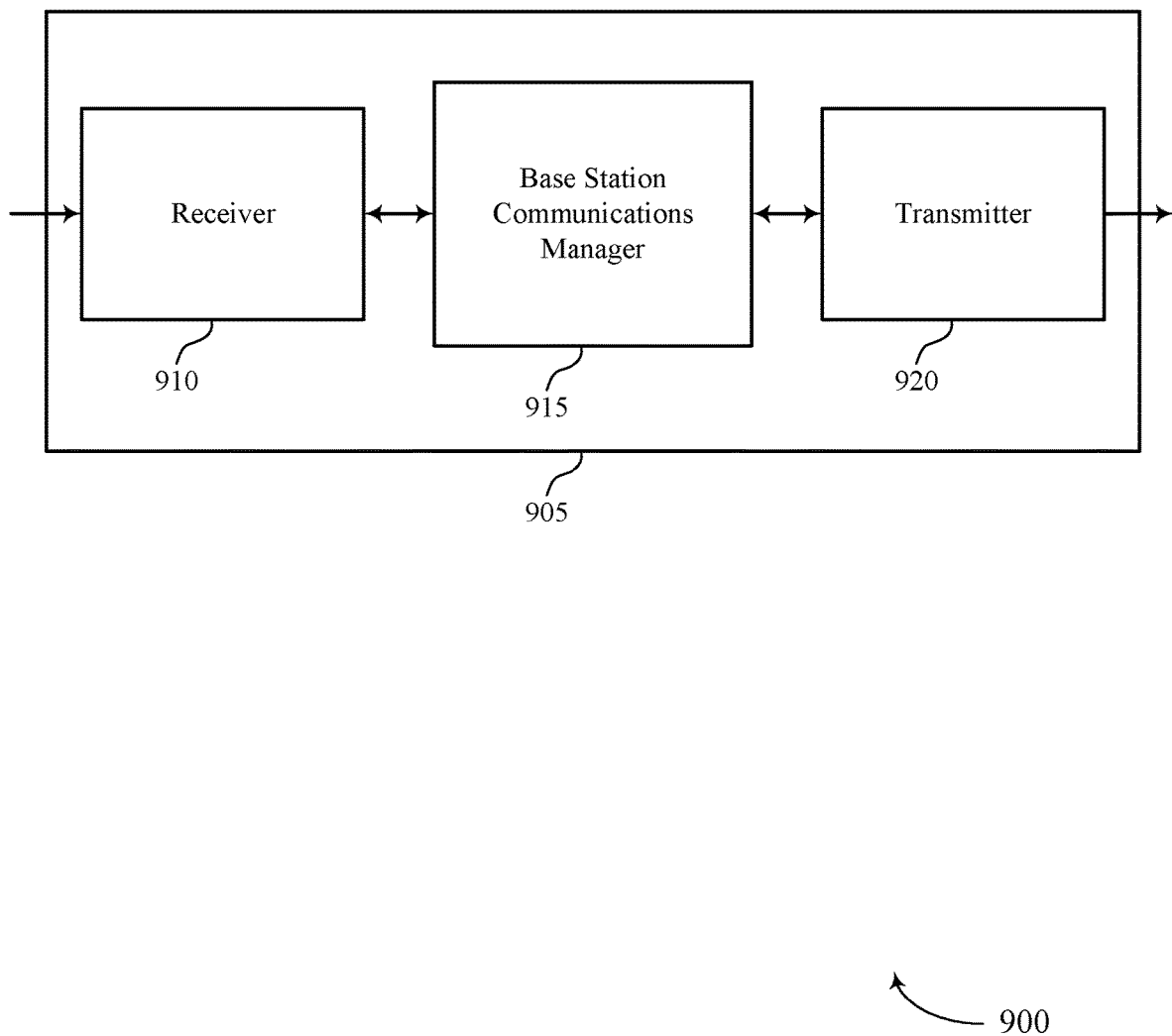
FIGS. 9 through 11 show block diagrams of a device in accordance with aspects of the present disclosure.

FIG. 9 shows a block diagram 900 of a wireless device 905 in accordance with aspects of the present disclosure. Wireless device 905 may be an example of aspects of a base station 105, a base station 205, a base station 305, and/or a base station 405 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to dynamic beam management for wireless communications, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may indicate, by a first base station (e.g., a base station 105, a base station 205, a base station 305, or a base station 405), one or more beam management configurations to a UE (a UE 115, a relay UE 210, a UE 215, a relay UE 310, a UE 315, or a relay UE 410), the one or more beam management configurations being for managing a beam based communication by the UE with the first base station. Base station communications manager 915 may identify, at the first base station, a first beam management configuration for managing a beam-based communication with the UE. Base station communications manager 915 may determine a configuration change trigger for triggering a change from the first beam management configuration to a second beam management configuration and modify a beam management configuration for communications with the UE according to the second beam management configuration based on the configuration change trigger. Base station communications manager 915 may communicate with the UE using beam-based communications in accordance with the beam management configuration at the first base station and one of the one or more beam management configurations indicated to the UE.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
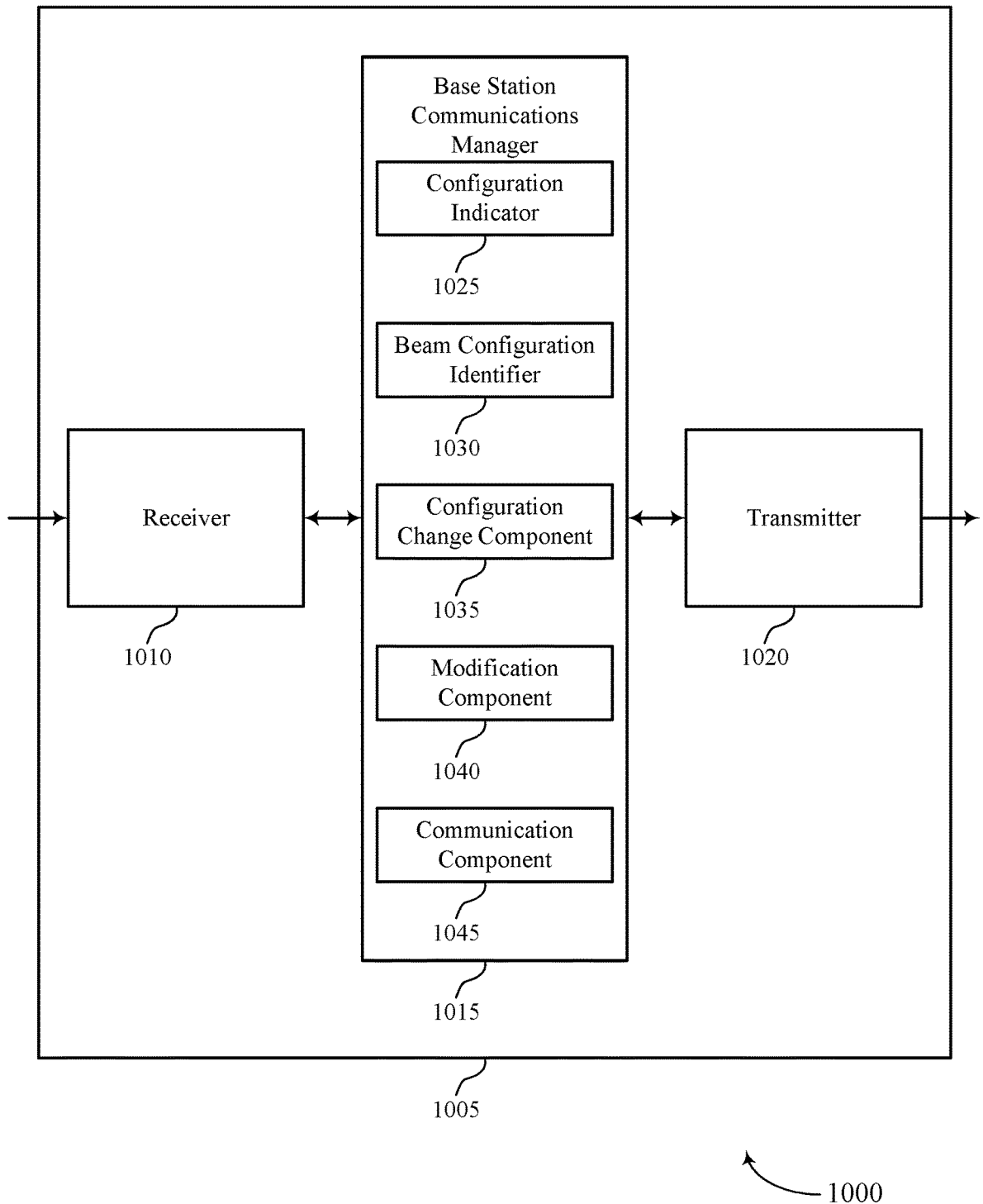

FIG. 10 shows a block diagram 1000 of a wireless device 1005 in accordance with aspects of the present disclosure. Wireless device 1005 may be an example of aspects of a wireless device 905, a base station 105, a base station 205, a base station 305, and/or a base station 405 as described with reference to FIGS. 1-4 and FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to dynamic beam management for wireless communications, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include configuration indicator 1025, beam configuration identifier 1030, configuration change component 1035, modification component 1040, and communication component 1045.

Configuration indicator 1025 may indicate, by a first base station (e.g., a base station 105, a base station 205, a base station 305, or a base station 405), one or more beam management configurations to a UE (a UE 115, a relay UE 210, a UE 215, a relay UE 310, a UE 315, or a relay UE 410), the one or more beam management configurations being for managing a beam based communication by the UE with the first base station. In some cases, indicating the one or more beam management configurations to the UE includes transmitting, to the UE, an indication of a set of beam management configurations for the UE. In some examples, the indication includes one or more bits, each of the one or more bits corresponding to a respective set of the set of beam management configurations. In some instances, the indication includes a single bit that indicates a change to a subsequent beam management configuration of the set of beam management configurations. In some aspects, the set of beam management configurations includes a sequence of beam management configurations. In some cases, the second beam management configuration follows the first beam management configuration in the sequence of beam management configurations. In some examples, the set of beam management configurations corresponds to a set of base stations including the first base station.

Beam configuration identifier 1030 may identify, at the first base station, a first beam management configuration for managing a beam-based communication with the UE. In some cases, the UE is associated with a high speed train. In some examples, the UE is a relay for a set of UEs.

Configuration change component 1035 may determine a configuration change trigger for triggering a change from the first beam management configuration to a second beam management configuration. In some cases, determining the configuration change trigger includes determining to change to the second beam management configuration based on a connection time of the UE or a duration of time allocated for the first beam management configuration. In some examples, the duration of time allocated is periodic or aperiodic.

Modification component 1040 may modify a beam management configuration for communications with the UE according to the second beam management configuration based on the configuration change trigger. In some cases, modifying the beam management configuration for communications with the UE includes increasing or decreasing a beam sweep periodicity according to the second beam management configuration. In some examples, modifying the beam management configuration for communications with the UE includes maintaining a beam sweep periodicity of the first beam management configuration and increasing or decreasing a beam width according to the second beam management configuration. In some aspects, the beam management configuration for communications with the UE includes a set of transmission beams to sweep, a set of reception beams to sweep, an antenna port configuration, a set of resources allocation for one or more beams, a measurement window for sweeping, a periodicity of a resource allocated for one or more beams, a reporting configuration, a beamforming configuration, or a combination thereof.

Communication component 1045 may communicate with the UE using beam-based communications in accordance with the beam management configuration at the first base station and one of the one or more beam management configurations indicated to the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
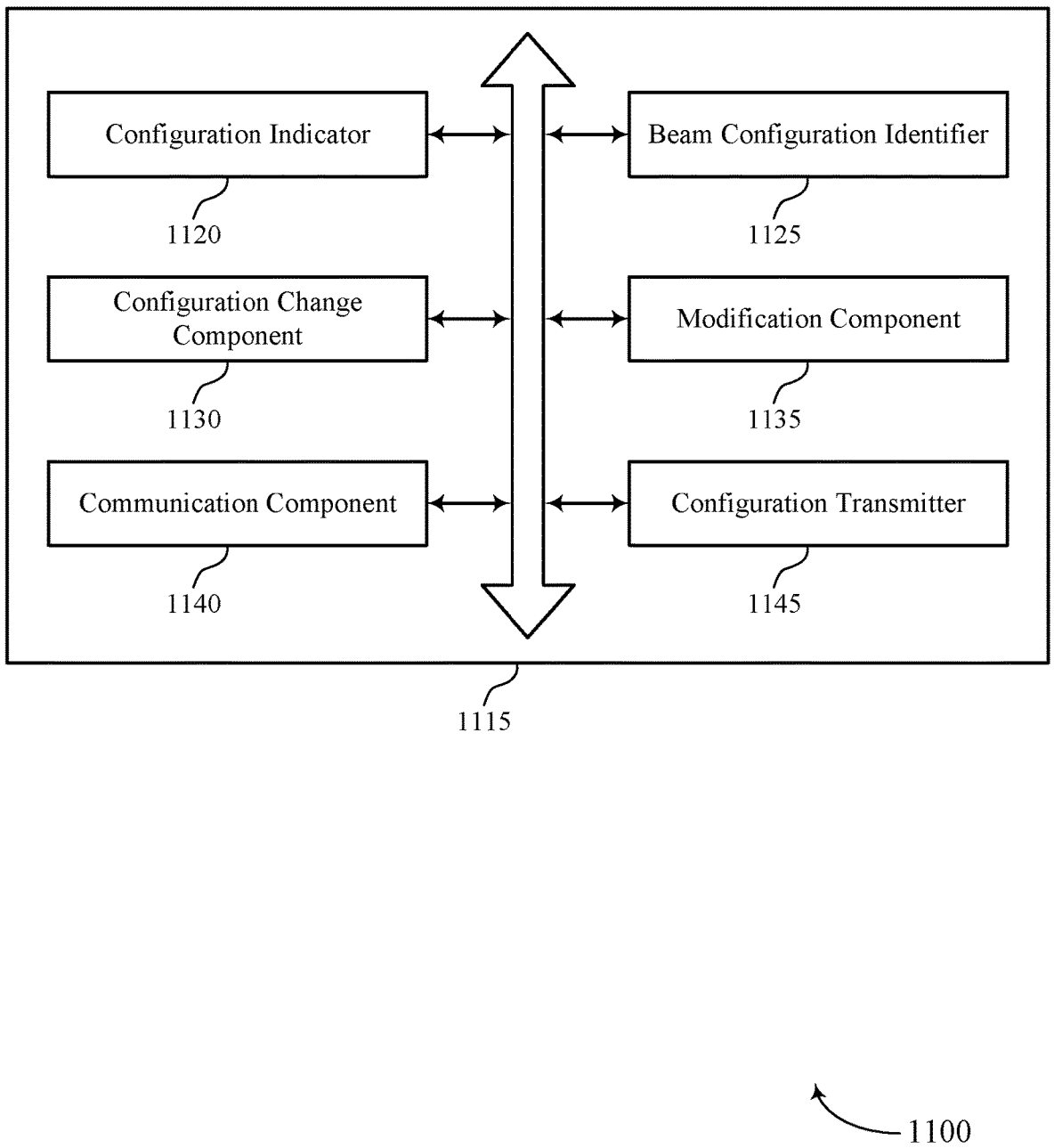

FIG. 11 shows a block diagram 1100 of a base station communications manager 1115 in accordance with aspects of the present disclosure. The base station communications manager 1115 may be an example of aspects of a base station communications manager 1215 described with reference to FIGS. 9, 10, and 12. The base station communications manager 1115 may include configuration indicator 1120, beam configuration identifier 1125, configuration change component 1130, modification component 1135, communication component 1140, and configuration transmitter 1145. Each of these modules may communicate, directly or indirectly, with one another (e.g., via one or more buses).

Configuration indicator 1120 may indicate, by a first base station, one or more beam management configurations to a UE, the one or more beam management configurations being for managing a beam based communication by the UE with the first base station. In some cases, indicating the one or more beam management configurations to the UE includes transmitting, to the UE, an indication of a set of beam management configurations for the UE. In some examples, the indication includes one or more bits, each of the one or more bits corresponding to a respective set of the set of beam management configurations. In some instances, the indication includes a single bit that indicates a change to a subsequent beam management configuration of the set of beam management configurations. In some aspects, the set of beam management configurations includes a sequence of beam management configurations. In some cases, the second beam management configuration follows the first beam management configuration in the sequence of beam management configurations. In some examples, the set of beam management configurations corresponds to a set of base stations including the first base station.

Beam configuration identifier 1125 may identify, at the first base station, a first beam management configuration for managing a beam-based communication with the UE. In some cases, the UE is associated with a high speed train. In some examples, the UE is a relay for a set of UEs.

Configuration change component 1130 may determine a configuration change trigger for triggering a change from the first beam management configuration to a second beam management configuration. In some cases, determining the configuration change trigger includes determining to change to the second beam management configuration based on a connection time of the UE or a duration of time allocated for the first beam management configuration. In some examples, the duration of time allocated is periodic or aperiodic.

Modification component 1135 may modify a beam management configuration for communications with the UE according to the second beam management configuration based on the configuration change trigger. In some cases, modifying the beam management configuration for communications with the UE includes increasing or decreasing a beam sweep periodicity according to the second beam management configuration. In some examples, modifying the beam management configuration for communications with the UE includes maintaining a beam sweep periodicity of the first beam management configuration and increasing or decreasing a beam width according to the second beam management configuration. In some aspects, the beam management configuration for communications with the UE includes a set of transmission beams to sweep, a set of reception beams to sweep, an antenna port configuration, a set of resources allocation for one or more beams, a measurement window for sweeping, a periodicity of a resource allocated for one or more beams, a reporting configuration, a beamforming configuration, or a combination thereof.

Communication component 1140 may communicate with the UE using beam-based communications in accordance with the beam management configuration at the first base station and one of the one or more beam management configurations indicated to the UE.

Configuration transmitter 1145 may transmit, to the UE, an indication of the second beam management configuration.

Figure 12:
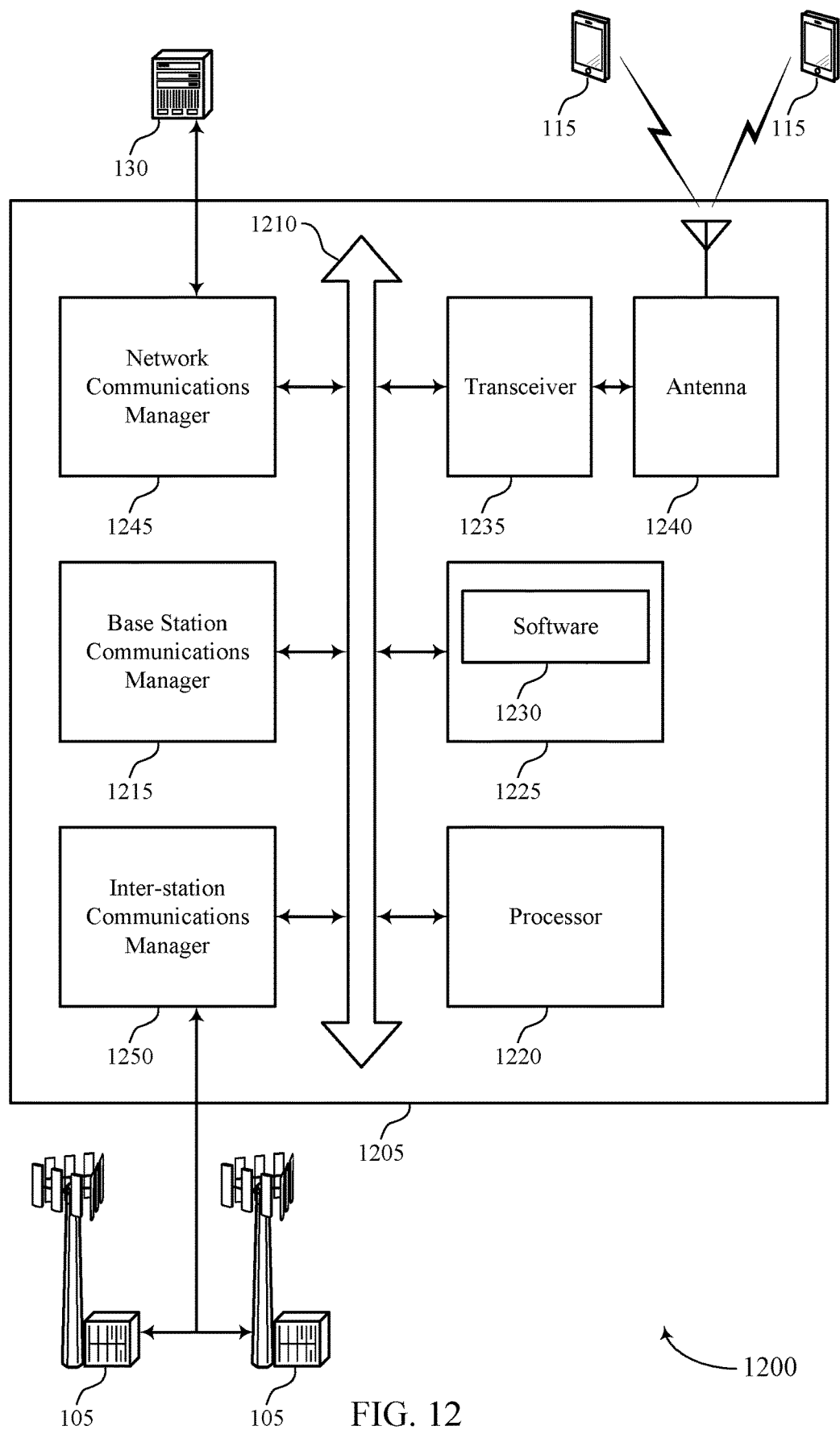
FIG. 12 illustrates a block diagram of a system including a base station in accordance with aspects of the present disclosure.

FIG. 12 shows a diagram of a system 1200 including a device 1205 in accordance with aspects of the present disclosure. Device 1205 may be an example of or include the components of a wireless device 905, a wireless device 1005, a base station 105, a base station 205, a base station 305, a base station 405 as described herein, e.g., with reference to FIGS. 1-4, FIG. 9, and FIG. 10. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting dynamic beam management for wireless communications).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support dynamic beam management for wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within a Long Term Evolution (LTE)/LTE-A wireless communication network technology to provide communication between base stations 105.

Figure 13:
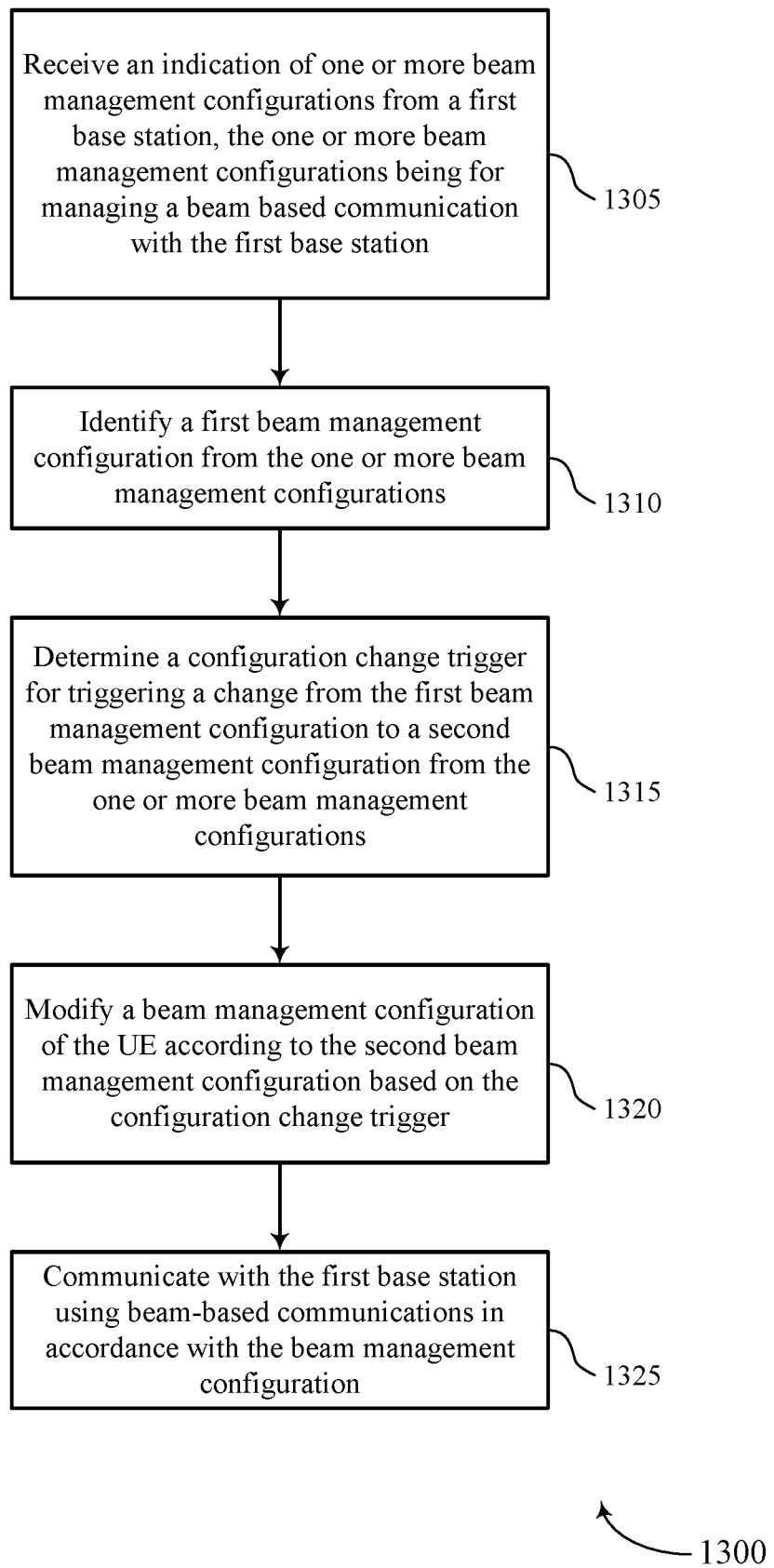
FIGS. 13 through 14 illustrate methods in accordance with aspects of the present disclosure.

FIG. 13 shows a flowchart illustrating a method 1300 in accordance with aspects of the present disclosure. The operations of method 1300 may be implemented by a UE 115 (or a relay UE 210, a UE 215, a relay UE 310, a UE 315, or a relay UE 410) or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive an indication of one or more beam management configurations from a first base station, the one or more beam management configurations being for managing a beam based communication with the first base station. The operations of 1305 may be performed according to the methods described herein. In certain examples, aspects of the operations of 1305 may be performed by an indication receiver as described with reference to FIGS. 5 through 8.

At 1310 the UE 115 may identify a first beam management configuration from the one or more beam management configurations. The operations of 1310 may be performed according to the methods described herein. In certain examples, aspects of the operations of 1310 may be performed by a configuration identifier as described with reference to FIGS. 5 through 8.

At 1315 the UE 115 may determine a configuration change trigger for triggering a change from the first beam management configuration to a second beam management configuration from the one or more beam management configurations. The operations of 1315 may be performed according to the methods described herein. In certain examples, aspects of the operations of 1315 may be performed by a trigger component as described with reference to FIGS. 5 through 8.

At 1320 the UE 115 may modify a beam management configuration of the UE according to the second beam management configuration based at least in part on the configuration change trigger. The operations of 1320 may be performed according to the methods described herein. In certain examples, aspects of the operations of 1320 may be performed by a configuration modifier as described with reference to FIGS. 5 through 8.

At 1325 the UE 115 may communicate with the first base station using beam-based communications in accordance with the beam management configuration. The operations of 1325 may be performed according to the methods described herein. In certain examples, aspects of the operations of 1325 may be performed by a communication component as described with reference to FIGS. 5 through 8.

Figure 14:
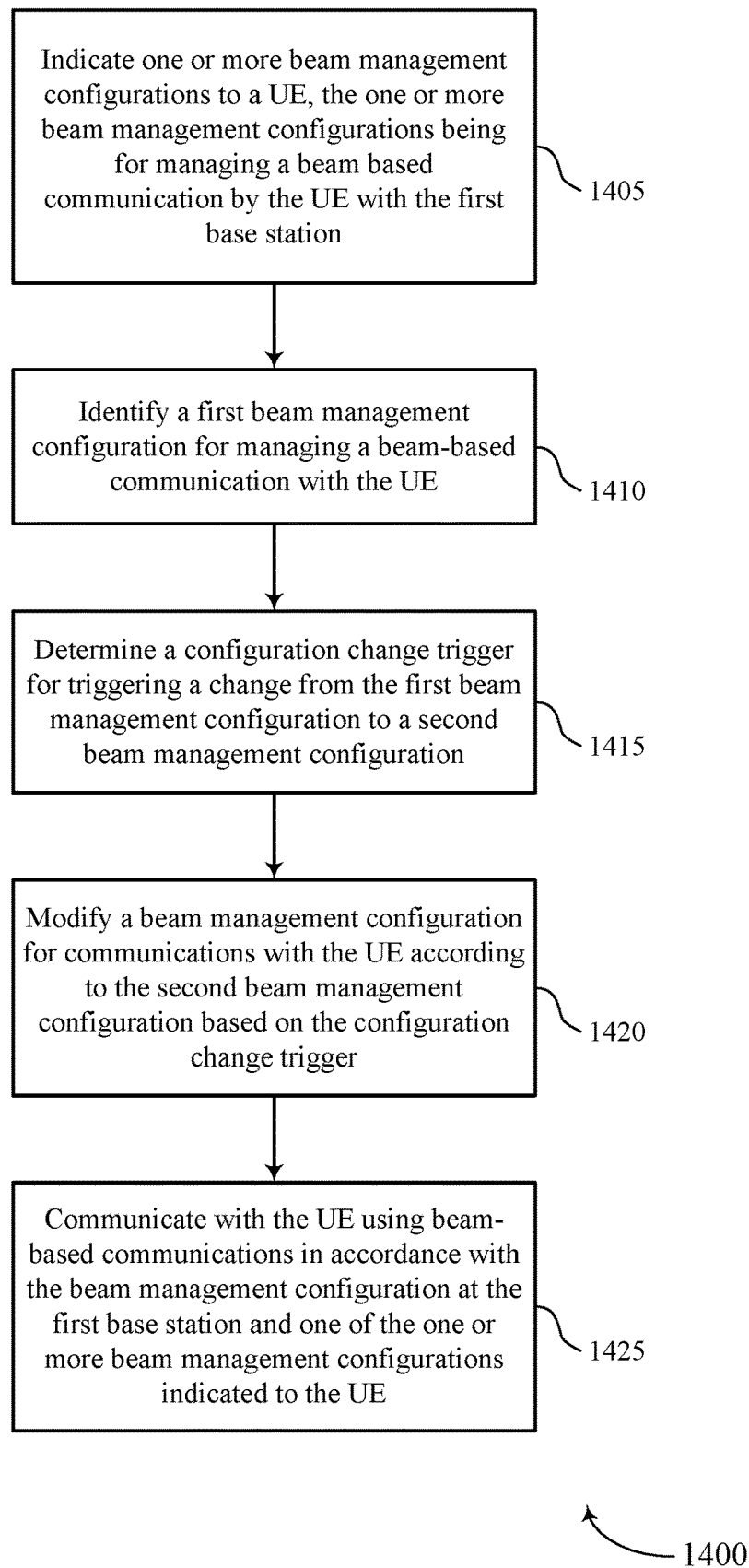

FIG. 14 shows a flowchart illustrating a method 1400 in accordance with aspects of the present disclosure. The operations of method 1400 may be implemented by a base station 105 (or a base station 205, a base station 305, or a base station 405) or its components as described herein. For example, the operations of method 1400 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may indicate one or more beam management configurations to a UE, the one or more beam management configurations being for managing a beam based communication by the UE with the first base station. The operations of 1405 may be performed according to the methods described herein. In certain examples, aspects of the operations of 1405 may be performed by a configuration indicator as described with reference to FIGS. 9 through 12.

At 1410 the base station 105 may identify a first beam management configuration for managing a beam-based communication with the UE. The operations of 1410 may be performed according to the methods described herein. In certain examples, aspects of the operations of 1410 may be performed by a beam configuration identifier as described with reference to FIGS. 9 through 12.

At 1415 the base station 105 may determine a configuration change trigger for triggering a change from the first beam management configuration to a second beam management configuration. The operations of 1415 may be performed according to the methods described herein. In certain examples, aspects of the operations of 1415 may be performed by a configuration change component as described with reference to FIGS. 9 through 12.

At 1420 the base station 105 may modify a beam management configuration for communications with the UE according to the second beam management configuration based at least in part on the configuration change trigger. The operations of 1420 may be performed according to the methods described herein. In certain examples, aspects of the operations of 1420 may be performed by a modification component as described with reference to FIGS. 9 through 12.

At 1425 the base station 105 may communicate with the UE using beam-based communications in accordance with the beam management configuration at the first base station and one of the one or more beam management configurations indicated to the UE. The operations of 1425 may be performed according to the methods described herein. In certain examples, aspects of the operations of 1425 may be performed by a communication component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving, at a user equipment (UE), an indication of one or more beam management configurations from a first base station, the one or more beam management configurations being for managing a beam based communication with the first base station;
   identifying, at the UE, a first beam management configuration from the one or more beam management configurations;
   determining, by the UE, a configuration change trigger for triggering a change from the first beam management configuration to a second beam management configuration from the one or more beam management configurations;
   modifying a beam management configuration of the UE according to the second beam management configuration based at least in part on the configuration change trigger; and communicating with the first base station using beam-based communications in accordance with the modified beam management configuration.

2. The method of claim 1, further comprising:
determining a location of the UE relative to the first base station or a second base station, wherein the configuration change trigger is determined based on the location of the UE.

3. The method of claim 2, wherein determining the location of the UE comprises:
determining a linear distance or an angular distance traveled by the UE.

4. The method of claim 2, wherein determining the location of the UE comprises:
estimating the location of the UE based at least in part on a round trip time (RTT) of downlink or uplink received timings.

5. The method of claim 1, wherein modifying the beam management configuration of the UE comprises:
increasing or decreasing a beam sweep periodicity according to the second beam management configuration.

6. The method of claim 1, wherein modifying the beam management configuration of the UE comprises:
maintaining a beam sweep periodicity of the first beam management configuration and increasing or decreasing a beam width according to the second beam management configuration.

7. The method of claim 1, wherein the one or more beam management configurations is a set of beam management configurations for the UE.

8. The method of claim 7, wherein:
the set of beam management configurations comprises a sequence of beam management configurations; and
the second beam management configuration follows the first beam management configuration in the sequence of beam management configurations.

9. The method of claim 7, wherein the set of beam management configurations corresponds to a set of base stations.

10. The method of claim 1, wherein determining the configuration change trigger comprises:
determining to change to the second beam management configuration based at least in part on a connection time of the UE or a duration of time allocated for the first beam management configuration.

11. The method of claim 10, wherein the duration of time allocated is periodic or aperiodic.

12. The method of claim 1, further comprising:
comparing a signal strength of a reference signal to a threshold, wherein the configuration change trigger is determined based at least in part on the comparison.

13. The method of claim 1, wherein the beam management configuration of the UE comprises a set of transmission beams to sweep, a set of reception beams to sweep, an antenna port configuration, a set of resources allocation for one or more beams, a measurement window for sweeping, a periodicity of a resource allocated for one or more beams, a reporting configuration, a beamforming configuration, or a combination thereof.

14. The method of claim 1, wherein the UE is associated with a high speed train.

15. The method of claim 1, wherein the UE is a relay for a set of UEs.

16. A method for wireless communications, comprising:
indicating, by a first base station, one or more beam management configurations to a user equipment (UE), the one or more beam management configurations being for managing a beam based communication by the UE with the first base station;
identifying, at the first base station, a first beam management configuration for managing a beam-based communication with the UE;
determining a configuration change trigger for triggering a change from the first beam management configuration to a second beam management configuration, wherein the configuration change trigger corresponds to a position of the UE relative to the first base station;
modifying a beam management configuration for communications with the UE according to the second beam management configuration based at least in part on the configuration change trigger, wherein modifying the beam management configuration comprises modifying a beam sweep periodicity, a beam width, or both based at least in part on a change in the position of the UE relative to the first base station; and
communicating with the UE using beam-based communications in accordance with the modified beam management configuration at the first base station and one of the one or more beam management configurations indicated to the UE.

17. The method of claim 16, wherein modifying the beam management configuration for communications with the UE comprises:
increasing or decreasing the beam sweep periodicity according to the second beam management configuration.

18. The method of claim 16, wherein modifying the beam management configuration for communications with the UE comprises:
maintaining the beam sweep periodicity of the first beam management configuration and increasing or decreasing the beam width according to the second beam management configuration.

19. The method of claim 16, wherein indicating the one or more beam management configurations to the UE comprises:
transmitting, to the UE, an indication of a set of beam management configurations for the UE.

20. The method of claim 19, wherein:
the set of beam management configurations comprises a sequence of beam management configurations; and
the second beam management configuration follows the first beam management configuration in the sequence of beam management configurations.

21. The method of claim 19, wherein the set of beam management configurations corresponds to a set of base stations including the first base station.

22. The method of claim 16, wherein determining the configuration change trigger comprises:
determining to change to the second beam management configuration based at least in part on a connection time of the UE or a duration of time allocated for the first beam management configuration.

23. The method of claim 22, wherein the duration of time allocated is periodic or aperiodic.

24. The method of claim 16, wherein the beam management configuration for communications with the UE comprises a set of transmission beams to sweep, a set of reception beams to sweep, an antenna port configuration, a set of resources allocation for one or more beams, a measurement window for sweeping, a periodicity of a resource allocated for one or more beams, a reporting configuration, a beamforming configuration, or a combination thereof.

25. The method of claim 16, wherein the UE is associated with a high speed train.

26. The method of claim 16, wherein the UE is a relay for a set of UEs.

27. An apparatus for wireless communications, comprising:
- a processor,
- memory in electronic communication with the processor; and
- instructions stored in the memory and executable by the processor to cause the apparatus to:
  - receive, at a user equipment (UE), an indication of one or more beam management configurations from a first base station, the one or more beam management configurations being for managing a beam based communication with the first base station;
  - identify, at the UE, a first beam management configuration from the one or more beam management configurations;
  - determine, by the UE, a configuration change trigger for triggering a change from the first beam management configuration to a second beam management configuration from the one or more beam management configurations;
  - modify a beam management configuration of the UE according to the second beam management configuration based at least in part on the configuration change trigger; and
  - communicate with the first base station using beam-based communications in accordance with the modified beam management configuration.

28. The apparatus of claim 27, wherein the instructions are further executable by the processor to cause the apparatus to:
- determine a location of the UE relative to the first base station or a second base station, wherein the configuration change trigger is determined based on the location of the UE.

29. The apparatus of claim 28, wherein the instructions to determine the location of the UE are executable by the processor to cause the apparatus to:
- determine a linear distance or an angular distance traveled by the UE.

30. An apparatus for wireless communications, comprising:
- a processor,
- memory in electronic communication with the processor; and
- instructions stored in the memory and executable by the processor to cause the apparatus to:
  - indicate, by a first base station, one or more beam management configurations to a user equipment (UE), the one or more beam management configurations being for managing a beam based communication by the UE with the first base station;
  - identify, at the first base station, a first beam management configuration for managing a beam-based communication with the UE;
  - determine a configuration change trigger for triggering a change from the first beam management configuration to a second beam management configuration, wherein the configuration change trigger corresponds to a position of the UE relative to the first base station;
  - modify a beam management configuration for communications with the UE according to the second beam management configuration based at least in part on the configuration change trigger, wherein modifying the beam management configuration comprises modifying a beam sweep periodicity, a beam width, or both based at least in part on a change in the position of the UE relative to the first base station; and
  - communicate with the UE using beam-based communications in accordance with the modified beam management configuration at the first base station and one of the one or more beam management configurations indicated to the UE.

* * * * *